(12) United States Patent
Ito et al.

(10) Patent No.: US 10,183,452 B2
(45) Date of Patent: Jan. 22, 2019

(54) CONTACT LENS AND PROCESS FOR PRODUCING SAME

(71) Applicant: MENICON CO., LTD., Nagoya-Shi, Aichi (JP)

(72) Inventors: Eri Ito, Kasugai (JP); Katsuhiro Yamamoto, Nagoya (JP)

(73) Assignee: MENICON CO., LTD., Nagoya (JP)

( * ) Notice: Subject to any disclaimer, the term of this patent is extended or adjusted under 35 U.S.C. 154(b) by 70 days.

(21) Appl. No.: 15/314,677

(22) PCT Filed: May 29, 2015

(86) PCT No.: PCT/JP2015/065543
§ 371 (c)(1),
(2) Date: Nov. 29, 2016

(87) PCT Pub. No.: WO2015/186620
PCT Pub. Date: Dec. 10, 2015

(65) Prior Publication Data
US 2017/0190126 A1 Jul. 6, 2017

(30) Foreign Application Priority Data
Jun. 3, 2014 (JP) ................................ 2014-115162

(51) Int. Cl.
*G02C 7/04* (2006.01)
*B29D 11/00* (2006.01)
(Continued)

(52) U.S. Cl.
CPC .... *B29D 11/00067* (2013.01); *C08F 290/068* (2013.01); *G02B 1/043* (2013.01);
(Continued)

(58) Field of Classification Search
None
See application file for complete search history.

(56) References Cited

U.S. PATENT DOCUMENTS 5,314,961 A * 5/1994 Anton .................. C08F 287/00
525/280
5,760,100 A 6/1998 Nicolson et al.
(Continued)

FOREIGN PATENT DOCUMENTS

| EP | 1197782 A1 | 4/2002 |
| EP | 1229376 A1 | 8/2002 |

(Continued)

OTHER PUBLICATIONS

Dec. 8, 2017 extended Search Report issued in European Patent Application No. 15802685.6.
(Continued)

*Primary Examiner* — Robert S Loewe
(74) *Attorney, Agent, or Firm* — Oliff PLC

(57) ABSTRACT

A contact lens is provided as a hydrate of a copolymer of at least three components including (I) a both terminal-polymerizable silicone oligomer component that forms a hydrophobic region (A) in the copolymer, (II) a hydrophilic component that forms a hydrophilic region (C) in the copolymer, and (III) a hydrophobic monomer component having a molecular weight of at most 700 that forms the hydrophilic region (C) together with the component (II) and also contributes to form an intermediate region (B) which does not solvate with a hydrophilic solvent between the hydrophobic region (A) and hydrophilic region (C), wherein the intermediate region (B) shows a volume rate of 5 to 40% with respect to the region (A) in the copolymer, and the contact lens is transparent and free from bubbles therein.

15 Claims, 9 Drawing Sheets

(51) Int. Cl.
  *C08F 290/06* (2006.01)
  *G02B 1/04* (2006.01)
  *C08G 77/20* (2006.01)
(52) U.S. Cl.
  CPC .............. *G02C 7/04* (2013.01); *G02C 7/049* (2013.01); *B29D 11/00038* (2013.01); *C08G 77/20* (2013.01); *C08L 2205/05* (2013.01)

(56) References Cited

U.S. PATENT DOCUMENTS

| | | | | |
|---|---|---|---|---|
| 5,789,461 | A * | 8/1998 | Nicolson | A61L 27/26 264/1.36 |
| 5,849,811 | A | 12/1998 | Nicolson et al. | |
| 6,638,991 | B2 | 10/2003 | Baba et al. | |
| 6,844,414 | B2 * | 1/2005 | Lai | A61L 27/18 528/37 |
| 6,867,245 | B2 * | 3/2005 | Iwata | B29D 11/00125 264/1.32 |
| 7,247,692 | B2 * | 7/2007 | Laredo | A61L 27/18 351/159.33 |
| 7,750,079 | B2 * | 7/2010 | Almond | C08F 220/18 522/172 |
| 8,124,668 | B2 * | 2/2012 | Baba | C08F 290/068 264/299 |
| 2002/0107324 | A1 * | 8/2002 | Vanderlaan | C08F 230/08 525/100 |
| 2002/0137811 | A1 * | 9/2002 | Turek | B29D 11/00317 523/106 |
| 2003/0139490 | A1 * | 7/2003 | Rathore | A61L 27/54 523/106 |
| 2004/0115242 | A1 * | 6/2004 | Meyers | A61L 12/088 424/429 |
| 2006/0001184 | A1 | 1/2006 | Phelan et al. | |
| 2006/0004165 | A1 * | 1/2006 | Phelan | C08F 230/08 351/159.33 |
| 2006/0142410 | A1 | 6/2006 | Baba et al. | |
| 2007/0100445 | A1 * | 5/2007 | Shadduck | A61F 2/1616 623/6.37 |
| 2008/0051513 | A1 * | 2/2008 | Kennedy | C08G 77/46 525/101 |
| 2008/0143003 | A1 * | 6/2008 | Phelan | B29D 11/00865 351/159.28 |
| 2010/0209468 | A1 * | 8/2010 | Kennedy | A61K 9/0024 424/422 |
| 2010/0258961 | A1 * | 10/2010 | Chang | G02B 1/043 264/1.38 |
| 2011/0230589 | A1 * | 9/2011 | Maggio | C07F 7/0854 523/107 |
| 2012/0220688 | A1 | 8/2012 | Wang et al. | |
| 2013/0046043 | A1 * | 2/2013 | Higgs | C08F 220/56 523/107 |

FOREIGN PATENT DOCUMENTS

| | | |
|---|---|---|
| EP | 1582910 A1 | 10/2005 |
| JP | H11-502949 A | 3/1999 |
| JP | 2004-351257 A | 12/2004 |
| JP | 2008-506549 A | 3/2008 |
| JP | 4235204 B2 | 3/2009 |
| JP | 4751421 B2 | 8/2011 |
| JP | 2011-219512 A | 11/2011 |
| WO | 01/23945 A1 | 4/2001 |
| WO | 01/44861 A1 | 8/2001 |
| WO | 2004/063795 A1 | 7/2004 |

OTHER PUBLICATIONS

Aug. 4, 2015 International Search Report issued in International Patent Application No. PCT/JP2015/065543.
Aug. 4, 2015 International Search Report issued in International Patent Application No. PCT/JP2015/065617.
U.S. Appl. No. 15/314,720, filed Nov. 29, 2016 in the name of Ito et al.
Dec. 6, 2016 International Preliminary Report on Patentability issued in International Patent Application No. PCT/JP2015/065543.
Dec. 6, 2016 International Preliminary Report on Patentability issued in International Patent Application No. PCT/JP2015/065617.
Jan. 18, 2018 extended European Search Report issued in Application No. 15803750.7.
Jan. 16, 2018 Office Action issued in Japanese Application No. 2014-115163.
Jan. 16, 2018 Office Action issued in Japanese Application No. 2014-115162.
May 4, 2018 U.S. Office Action Issued in U.S. Appl. No. 15/314,720.

* cited by examiner

CONTACT LENS AND PROCESS FOR PRODUCING SAME

TECHNICAL FIELD

The present invention relates to a contact lens which satisfies a combination of a high oxygen permeability and a balance of softness and mechanical properties, in addition to a transparency, and a process for production of the contact lens.

BACKGROUND ART

For long years, contact lenses were predominantly produced as a hard lens (RGP) having a high oxygen permeability, and a soft contact lens (SCL) consisting mainly of hydro-gel which forms gel by absorption of water. The former, based on high oxygen permeability, has an advantage that a risk of obstructing cornea physiology activity is low, whereas it involves a problem of an inferior feeling in use because of its hardness. On the other hand, the latter, consisting of hydro-gel, is excellent in a feeling of use, but it involves a problem of low oxygen permeability.

In order to solve these problems, silicone hydro-gel has been developed as a high oxygen permeability soft contact lens material. Silicone hydro-gel is formed by producing a copolymer of an oxygen-permeable silicone component, like RGP, and a hydrophilic component used for the hydro-gel. Particularly, it is well-known to use, as a main ingredient of the silicone hydro-gel, a copolymer of a hydrophobic and high-molecular weight dimethylsiloxane macro monomer and a hydrophilic component (Patent documents 1-4). The silicone hydro-gel having thus a combination of mutually contradictory components is a material attracting attention these days, because it provides a good feeling in use like a conventional SCL, while satisfying a high oxygen permeability comparable to that of a conventional RGP.

However, in the case where the silicone hydro-gel is formed as a copolymer, even when ingredient materials of mutually contradictory properties appear to be mixed uniformly in a step of mixing them, the resultant mixture can result in an opaque copolymer, thus causing devitrification, after a polymerization thereof, in some cases. This is a fatal defect for the contact lens which is an optical product. Thus, the use of a silicone copolymer has realized an oxygen permeability higher than the hydro-gel lens, whereas it becomes a polymer with a higher elasticity than the conventional hydro-gel. Therefore, when it is used as a contact lens, it provides an inferior feeling in daily use, compared with a conventional hydro-gel lens, and can even result in lesions of anterior epithelium of cornea, generically called SEALs (Superior Epithelial Arcuate Lesions) peculiarly caused by wearing silicone hydro-gel lenses.

PRIOR ART DOCUMENTS

Patent Documents

[Patent document 1] JP 4751421B
[Patent document 2] WO 01/44861A
[Patent document 3] JP 4235204B
[Patent document 4] JP 2011-219512A.

Non-Patent Documents

[Nonpatent document 1] "New Polymer Experimentology 6: Polymer Structure (2), Scattering Experiment and Morphology Observation", Edited by The Society of Polymer Science, Japan (1997), pp. 191-256; Chapter 2: X-ray Diffraction, 2.2 Small-angle X-ray Scattering, and 2.3 Synchrotron Radiation X-ray Analysis.
[Nonpatent document 2] "Chemical Engineering Handbook, 6th Edition", Published by Maruzen Co., Ltd. November (1999), 7.2 Homogeneous Phase Stirring, pp. 426-434.
[Nonpatent document 3] Nagata, et al.; "Chemical Engineering", Vol. 21, No. 11 (1957) pp. 708-715.
[Nonpatent document 4] Nagata, et al. "Chemical Engineering", Vol. 23, No. 3 (1959) pp. 130-137.
[Nonpatent document 5] R. Hernandez et al.; "Macromolecules 2007" Vol. 40, pp. 5441-5449
[Nonpatent document 6] "Eye & Contact Lens", Vol. 34(3) (2008); pp. 146-150

SUMMARY OF THE INVENTION

Problems to be Solved by the Invention

A principal object of the present invention is to stably provide a contact lens which has a balance of high oxygen permeability, pliability and kinetic properties in addition to transparency.

Another object of the present invention is to provide a process for producing a contact lens satisfying the above characteristics stably and efficiently.

Means for Solving the Problems

The contact lens according to the present invention, comprises: a hydrate of a copolymer of at least three components including (I) a both terminal-polymerizable silicone oligomer component that forms a hydrophobic region (A) in the copolymer, (II) a hydrophilic monomer component that forms a hydrophilic region (C) in the copolymer, and (III) a hydrophobic monomer component having a molecular weight of at most 700 that forms the hydrophilic region (C) together with the component (II) and also contributes to formation of an intermediate region (B) which does not solvate with a hydrophilic solvent between the hydrophobic region (A) and the hydrophilic region (C), wherein said intermediate region (B) shows a volume rate of 5 to 40% with respect to the region (A) in the copolymer, and the contact lens is transparent and free from bubbles therein.

The process for producing a contact lens according to the present invention, comprises: stirring a material liquid comprising at least three components of the above-mentioned components (I), (II) and (III) under a stirring power of 5-10000 W/m$^3$ per unit volume of the material liquid for at least 10 minutes, and then injecting the stirred material liquid into a lens mold to polymerize the material liquid.

A brief description is made on a historical background through which the present inventors studied with above-mentioned object to arrive at the present invention. Aiming at a contact lens satisfying the above-mentioned characteristics, the present inventors analyzed earnestly microscopic texture of silicone hydro-gel copolymers comprising various combinations of components by the small-angle X-ray scattering method. As a result, it has been discovered that, in order to form especially a silicone hydro-gel copolymer satisfying the balance of high oxygen permeability, softness and kinetic property, it is necessary to form not only a texture including co-continuous phases of a hydrophilic region and a hydrophobic region which were known heretofore, but also a well-developed intermediate region which comprises constituents similar to those of the hydrophilic region but is not easily swollen with hydrophilic solvents, such as water and methanol, owing to the influence of the hydrophobic region, unlike the hydrophilic region. Furthermore, it has been also found that, in order to form such a developed intermediate region, the silicone hydro-gel copolymer is required to be formed from at least three constituents including (I) a both terminal-polymerizable silicone oligomer component that forms a hydrophobic region (A) in the copolymer, (II) a hydrophilic component that forms a hydrophilic region (C) in the copolymer, and in addition thereto, (III) a hydrophobic monomer component having a molecular weight of at most 700 that forms the hydrophilic region (C) together with the component (II) and also contributes to formation of such an intermediate region between the hydrophobic region (A) and the hydrophilic region (C). (Incidentally, it has been confirmed by the EDS analysis (energy dispersion-type spectrum analysis) using STEM (scanning transmission electron microscope) that the component (III) is present in both the hydrophilic region (C) and the intermediate region (B).)

It has been also found that, for the development of the above-mentioned intermediate region, it is also required to uniformize the above-mentioned at least three-ingredients of (I)-(III) constituting a silicone hydro-gel copolymer through an appropriate degree of stirring before the polymerization. More specifically, for the development of the above-mentioned intermediate region, it has been discovered that an apparently homogeneous-mixing state that can be confirmed by an apparent transparency free from fluctuation due to segregation of ingredients as attained by a mixing at a small-scale flask level conventionally performed in screening of preferable copolymerization ingredients for formation of silicone hydro-gel copolymers as described above, is not sufficient, but an optically uniform state accomplished by a more positive stirring is necessary. Nevertheless, as compared with the material of conventional hard lens or the material of hydro-gel lens containing 2-hydroxyethyl methacrylate as a main ingredient, the raw material composition containing an oligomer component (I) is accompanied with characteristics, such as a low specific heat liable to cause a temperature increase and a high viscosity leading to slow thermal diffusion, which are liable to be enhanced by inclusion of the silicone component. Accordingly, excessive stirring causing stirring heat is liable to form a system resulting in local heating of the raw mixture liquid leading to initiation of polymerization in the stirring-mixing stage. Further, in case of excessive stirring, the starting mixture liquid is liable to cause inclusion of bubbles due to a high viscosity thereof, requiring a long period of standing or an additional operation step for removal thereof and thus being liable to result in a remarkable lowering in productivity and occurrence of inferior product contact lenses. On the other hand, there are increasing desires of users for prevention of ophthalmic disorder due to contamination by the bacillus of a lens etc., and for convenience, the contact lenses of these days are becoming popular in the type of usage accompanied by frequent exchange. As the increase in the users desire for frequency of exchange leading to an increase in amount of silicone hydro-gel copolymers to be supplied, it has been found that stirring management of the material composition is very important for supply of good silicone hydro-gel contact lenses. The contact lens and the production process therefor of the present invention have been obtained based on the above-mentioned series of knowledge.

EMBODIMENTS OF THE INVENTION

Figure 1:
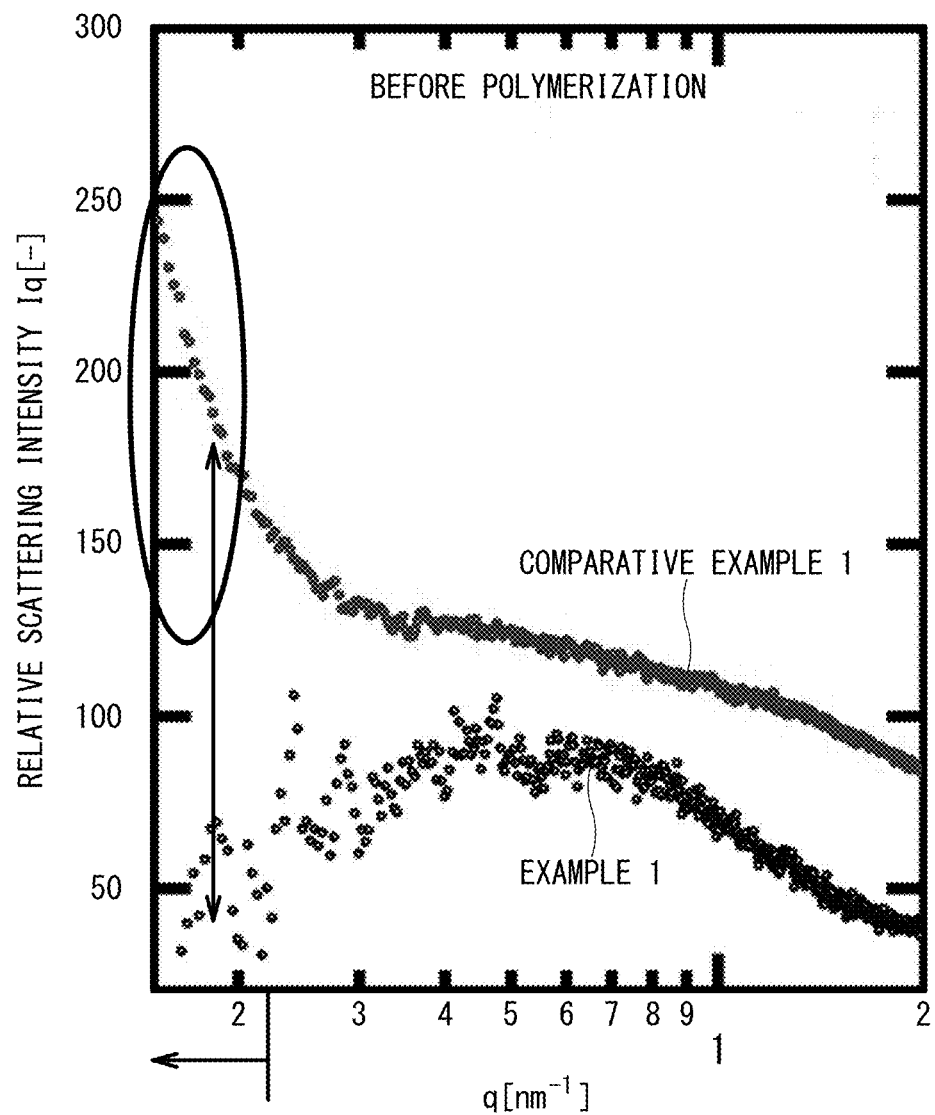
FIG. 1 is a plot of measured small-angle X-ray scattering intensities of material mixture solutions after the stirring and before the polymerization obtained in Example 1 and Comparative Example 1 described hereafter.

Hereinafter, the present invention will be described sequentially about preferred embodiments thereof along the order of steps in the process for production of a contact lens. In the following description, "part(s)" and "%" used for describing compositions are by weight unless otherwise noted specifically.

[Components Forming Silicone Hydro-Gels]

As mentioned above, at least one species each is selected from the compounds belonging to the following components (I)-(III) and is used. Incidentally, regarding the terms used herein with reference to the components (I)-(III), "hydrophilic(ity)" refers to a component which can provide a visibly homogeneous solution when mixed with an identical quantity of water at room temperature (25° C.), and "hydrophobic(ity)" refers to a component which cannot provide a visibly homogeneous solution when mixed with an identical quantity of water at room temperature (25° C.), Component (I): Hydrophobic-Region (A)-Forming Component It is a silicone oligomer showing a viscosity of at least 200 mPa·s at room temperature and preferably has a polystyrene-equivalent number-average molecular weight according to GPC (gel permeation chromatography) of about 1000 to 100000. It is particularly preferred to use a both terminal-polymerizable macro-monomer having a siloxane structure denoted by a general formula (I-1) or a general formula (I-2) as shown below:

polysiloxane macro-monomer represented by

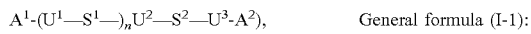
$$A^1\text{-}(U^1\text{—}S^1\text{—})_nU^2\text{—}S^2\text{—}U^3\text{-}A^2),\quad\text{General formula (I-1):}$$

[wherein $A^1$ and $A^2$ each independently denote an active unsaturated group which has an active unsaturated polymerizable terminal group, an alkylene group of 1-20 carbon atoms, or an alkylene glycol group of 1-20 carbon atoms, $U^1$ denotes a diurethane unit which forms a urethane bond, a diurea unit which forms a urea bond, a diamide unit which forms an amide bond, or a diester unit which forms an ester bond, respectively, together with $A^1$ and $S^1$ or $S^1$ and $S^1$, neighboring on both sides thereof, $U^2$ denotes a diurethane unit which forms a urethane bond, a diurea unit which forms a urea bond, a diamide unit which forms an amide bond, or a diester unit which forms an ester bond, respectively, together with $A^1$ and $S^2$ or $S^1$ and $S^2$, neighboring on both sides thereof, $U^3$ denotes a diurethane unit which forms a urethane bond, a diurea unit which forms a urea bond, a diamide unit which forms an amide bond, or a diester unit which forms an ester bond, respectively, together with $S^2$ and $A^2$, neighboring on both sides thereof, $S^1$ and $S^2$ each independently denote a group represented by:

[Formula 1]

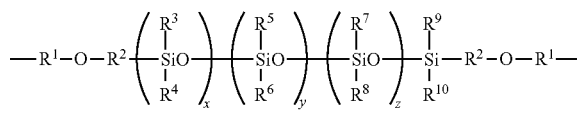

(wherein $R^1$ and $R^2$ each independently denote an alkylene group of 1-20 carbon atoms, $R^3$, $R^4$, $R^5$, $R^6$, $R^7$, $R^8$, $R^9$, and $R^{10}$ each independently denote a linear, branched or cyclic alkyl group of 1-20 carbon atoms capable of being substituted by a fluorine atom, a group represented by a formula: $A^3\text{-}U^4\text{—}R^1\text{—}O\text{—}R^2\text{—}$ (wherein $A^3$ denotes a terminal-polymerizable active unsaturated group, a terminal-polymerizable active unsaturated group having an alkylene group of 1-20 carbon atoms, or a terminal-polymerizable active unsaturated group having an alkylene glycol group of 1-20 carbon atoms, $U^4$ denotes a diurethane unit which forms a urethane bond, a diurea unit which forms a urea bond, a diamide unit which forms an amide bond, or a diester unit which forms an ester bond, respectively together with $A^3$ and $R^1$, and $R^1$ and $R^2$ are the same as denoted above), or a linear or cyclic hydrocarbon group having at least one substituent selected from hydroxyl group and oxyalkylene group, x denotes an integer of 1-1500, y denotes 0 or an integer of 1-1499, z denotes 0 or an integer of 1-1499, and x+y+z makes an integer of 1-1500), n denotes 0 or an integer of 1-10];

a both terminal-polymerizable polysiloxane macro-monomer represented by:

$$B^1\text{—}S^3\text{—}B^1\quad\text{General formula (I-2):}$$

[wherein $B^1$ denotes a terminal-polymerizable active unsaturated unit having a urethane bond, a urea bond, an amide bond, or an ester bond, $S^3$ denotes a group represented by:

[Formula 2]

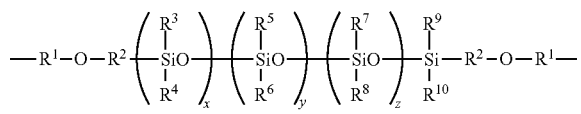

(wherein $R^1$ and $R^2$ each independently denote an alkylene group of 1-20 carbon atoms, $R^3$, $R^4$, $R^5$, $R^6$, $R^7$, $R^8$, $R^9$, and $R^{10}$ each independently denote a linear, branched or cyclic alkyl group of 1-20 carbon atoms capable of being substituted by a fluorine atom, a group represented by a formula: $A^3\text{-}U^4\text{—}R^1\text{—}O\text{—}R^2\text{—}$ (wherein $A^3$ denotes a terminal-polymerizable active unsaturated unit, a terminal-polymerizable active unsaturated unit having an alkylene group of 1-20 carbon atoms, or a terminal-polymerizable active unsaturated unit having an alkylene glycol group of 1-20 carbon atoms, $U^4$ denotes a diurethane unit which forms a urethane bond, a diurea unit which forms a urea bond, a diamide unit which forms an amide bond, or a diester unit which forms an ester bond, respectively together with $A^3$ and $R^1$, and $R^1$ and $R^2$ are the same as denoted above), or a linear or cyclic hydrocarbon group having at least one substituent selected from hydroxyl group and oxyalkylene group, x denotes an integer of 1-1500, y denotes 0 or an integer of 1-1499, z denotes 0 or an integer of 1-1499, and x+y+z makes an integer of 1-1500).

In the above-mentioned general formula (I-1), the terminal polymerizable active unsaturated group denoted by $A^1$ and $A^2$, may for example be a (meth)acryloyl group, a vinyl group, an allyl group, a (meth)acryloyloxy group, a vinyl carbamate group, etc., as described above. Among these, an acryloyloxy group and a vinyl group are preferred, and especially an acryloyloxy group is particularly preferred, from the viewpoints of ability of giving still better flexibility to the lens material and excellent copolymerizability with the other polymerizable components.

In case where the above-mentioned terminal-polymerizable active unsaturated group has an alkylene group or an alkylene glycol group, the alkylene group or alkylene glycol group may preferably have 1-20 carbon atoms, and more preferably 1-10 carbon atoms.

In the following Formula 3 representing the group $S^1$ and $S^2$ in the general formula (I-1),

[Formula 3]

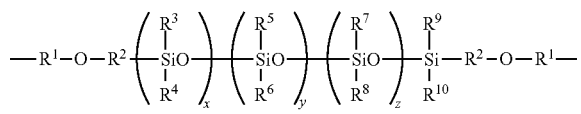

(wherein $R^1$, $R^2$, $R^3$, $R^4$, $R^5$, $R^6$, $R^7$, $R^8$, $R^9$, $R^{10}$ x, y, and z are the same as mentioned above), it is further preferred that $R^1$ and $R^2$ are alkylene groups of 1-5 carbon atoms, $R^3$-$R^{10}$ are alkyl groups of 1-5 carbon atoms, $A^3$ in the formula: $A^3\text{-}U^4\text{—}R^1\text{—}O\text{—}R^2\text{—}$ representing $R^3$-$R^8$ denotes a terminal-polymerizable active unsaturated group as mentioned above; in case where the above-mentioned terminal-polymerizable active unsaturated group has an alkylene group or an alkylene glycol group, the alkylene group or alkylene glycol group has 1-20 carbon atoms, and more preferably 1-10 carbon atoms. It is further preferred that x is 0 or an integer of 1-500, y is o or an integer of 1-499, z is 0 or an integer of 1-500, and x+y+z is an integer of 1-500. Further, it is preferred that n in the general formula (I-1) is 0 or an integer of 1-5.

On the other hand, the terminal-polymerizable active unsaturated unit having a urethane bond denoted by $B^1$ in the above-mentioned general formula (I-2) may for example be a group originated from (meth)acryloyloxy alkyl isocyanate, allyl isocyanate, or vinylbenzyl isocyanate, etc. The unit denoted by $S^3$ in the general formula (I-2) is similar to the unit denoted by $S^1$ and $S^2$ in the above-mentioned general formula (I-1).

Among the above-mentioned both-terminal-polymerizable macro monomers, a both-terminal-polymerizable macro monomer represented by a formula: $A^1$-$U^2$—$S^2$—$U^3$-$A^2$ (wherein $A^1$, $A^2$, $U^2$, $U^3$, and $S^2$ are the same as mentioned above), and a both-terminal-polymerizable macro monomer having a siloxane structure represented by a formula: $A^1$-$(U^1$—$S^1$—$)^{n'}.U^2$—$S^2$—$U^3$-$A^2$ (wherein $A^1$, $A^2$, $U^1$, $U^2$, $U^3$, $S^1$, and $S^2$ are the same as mentioned above, and n' denotes an integer of 1-4), are preferred from the viewpoints of shape recoverability and a large mechanical strength-imparting ability, and it is particularly preferred to use a both-terminal-polymerizable polysiloxane macro monomer represented by a formula:

[Formula 4]

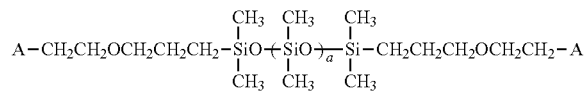

(wherein A denotes a group represented by:

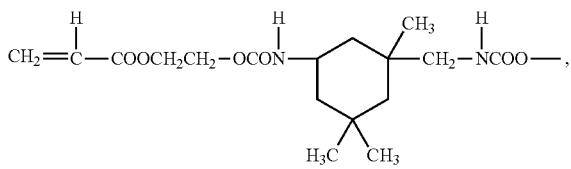

and a is an integer of 20-50).

It is preferred that the component (I) is used at a rate of 1 to 40%, particularly 2 to 35%, of the total quantity of the components (I)-(III). Below 1%, a high oxygen permeability demonstrated based on the mobility of the silicone unit is not acquired. On the other hand, in excess of 40%, the elastic modulus of the material itself becomes excessively high to result in an inferior feeling of wearing, and also a lower wettability with eyes of the lens itself, leading to sticking of the lens to a cornea or cornea disorder represented by SEALs due to friction between a lens and a cornea surface.

Component (II): A Component Forming the Hydrophilic Region (C) and the Intermediate Region (B)

It is a hydrophilic monomer component having a polymerizable group (ethylenically unsaturated group).

More specifically, it is selected from specific examples thereof including: 1-alkyl-3-methylene-2-pyrrolidones, such as 1-methyl 3-methylene 2-pyrrolidone; N-substituted acrylamides, such as N-dimethylacryl amide; N-vinyl lactams, such as N-vinyl-2-pyrrolidone; acetamides, such as N-ethenyl-N-methyl acetamide; hydroxyalkyl (meth)acrylates, such as 2-hydroxyethyl (meth)acrylate; ethylene glycol mono-(meth)acrylates; (alkyl) amino alkyl (meth)acrylates, such as 2-dimethylaminoethyl (meth)acrylate; and acrylic acid. These compounds may be used singly or in mixture of 2 or more species.

Incidentally, the term "(meth)acrylate" used herein means "acrylate and/or methacrylate" and this holds true with other (meth)acrylate derivatives.

It is preferred that the component (II) is used at a rate of 10 to 60%, particularly 20 to 50%, of the total quantity of the components (I)-(III). Below 10%, wettability with tear and softness sufficient as a soft contact lens are not acquired, and adhesiveness peculiar to silicone becomes noticeable to result in a liability of the lens sticking to a cornea. And above 60%, the moisture content of the lens is liable to become excessively high, and the effect due to application of silicone is not demonstrated sufficiently, thus being liable to result in failure of high oxygen permeability or fragility of the lens.

Component (III): Intermediate-Region (B) Formation-Promoting Component

It is a component which provides a copolymer forming a hydrophilic region (C) together with the above-mentioned component (II) and also is a component which can promote the formation, in the finally formed polymer, of an intermediate region (B) that comprises a copolymer with the hydrophilic component (II) but does not solvate with a hydrophilic solvent, around the hydrophobic region (A). It is a component which per se is a hydrophobic monomer component having a molecular weight of at most 700. It may contain or not contain silicon.

It has been confirmed by the EDS analysis using a STEM that this intermediate-region formation-promoting component (III) is present in both the hydrophilic region (C) and the intermediate region (B), in the copolymer product obtained after the polymerization.

Specific examples of the component may include: silicone-containing alkyl (meth)acrylates, alkyl (meth)acrylates, and fluorine-containing alkyl (meth)acrylates; and more specifically: silicone-containing alkyl (meth)acrylates, such as tris(trimethyl-siloxy)silylpropyl (meth)acrylate and methyldi(trimethylsiloxy)-silylpropyl glyceryl methacrylate; alkyl (meth)acrylates including those containing short-chain alkyls, such as methyl (meth)acrylate and ethyl (meth)acrylate, and those containing long-chain alkyls, such as lauryl (meth)acrylate; alkoxyalkyl (meth)acrylates, such as 2-methoxy ethyl (meth)acrylate; fluorine-containing alkyl (meth)acrylates, such as 2,2,2-trifluoroethyl (meth)acrylate. These compounds may be used singly or in mixture of 2 or more species.

It is preferred that the component (III) is used at a rate of 10 to 45%, particularly 15 to 40%, of the total quantity of the components (I)-(III). Below 10%, it is impossible to efficiently form the intermediate region (B), and in excess of 45%, it becomes difficult to attain a material having a sufficient softness leading to a good feeling of wearing and also a high oxygen permeability, that is a material satisfying both properties in combination, and even becomes liable to result in a lowering in transparency in a product lens in an extreme case.

(Other Components)

While the material liquid before the polymerization for obtaining the product copolymer forming the contact lens of the present invention fundamentally comprises the above-mentioned components (I)-(III), it can contain another component as needed.

For example, it is possible to add a crosslinking agent for adjusting the crosslinking density, softness, and hardness, of the product copolymer. Examples of such a crosslinking agent may include: allyl (meth)acrylate, vinyl (meth)acrylate, 4-vinylbenzyl (meth)acrylate, 3-vinylbenzyl (meth) acrylate, (meth)acryloyloxy-ethyl (meth)acrylate, ethylene glycol di(meth)acrylate, diethylene glycol di (meth)acrylate, diethylene glycol diallyl ether, triethylene glycol di(meth) acrylate, tetraethylene glycol di(meth)acrylate, propylene glycol di(meth)acrylate, dipropylene glycol di(meth)acrylate, butane diol di(meth)acrylate, trimethylolpropane tri (meth)acrylate, etc. These crosslinking agents may be used singly or in mixture of plural species.

In the above-mentioned polymerization composition, the crosslinking agent may preferably be used at a rate of at least 0.05 wt. part and at most 1 wt. part, particularly 0.1-0.8 wt. part, per 100 wt. parts of total quantity of the above-mentioned components (I)-(III). By using such a crosslinking agent not less than the above-mentioned lower limit, it becomes possible to impart morphological stability, strength, endurance, etc. to the polymer material, and also can ensure the control of softness etc. On the other hand, by using the crosslinking agent not more than the above-mentioned upper limit, it becomes possible to prevent the polymer material from becoming excessively hard. Since the crosslinking agent is used in such a small quantity, the amount thereof can be ignored in calculation of the volume rates of the regions (A), (B) and (C), even if contained in the product copolymer.

Examples of the other ingredients possibly contained in the polymerization material liquid may include: an initiator for thermal polymerization or photo polymerization that may be contained at a rate of up to 2 parts, and a hydrophilic organic solvent for viscosity control or improving compatibility among the ingredients of the polymerization material liquid, such as an alcohol having 1-5 carbon atoms, methyl ethyl ketone, dimethylformamide, dimethyl sulfoxide, acetonitrile, N-methyl-2-pyrroridone, or dimethoxyethane, that may be contained at a rate of up to 100 parts, respectively per 100 parts of the total quantity of the above-mentioned component (I)-(III).

[Stirring Conditions]

In order to produce the copolymer forming the contact lens of the present invention, it is preferred to perform stirring which gives a stirring power per unit volume of 5-10000 W/m$^3$ to the material liquid containing at least the above components (I)-(III) for at least 10 minutes, and it is preferred that this provides a stirring energy per unit volume of 5-20000 kJ/m$^3$. Thereafter, the material mixture solution after the stirring is cast into a lens mold and polymerized therein to provide a contact lens. The above-mentioned material liquid is classified as a medium-to-low viscosity liquid having a viscosity of about 0.01-0.40 Pa·s. It is possible to use any of various forms of stirring blades, such as a paddle, a disk turbine, a curved blade fan turbine, a fletching turbine, a Pfaudler-type, a Brumargin type, an inclination paddle, and a propeller, as illustrated in Non-patent document 2. It is also possible to apply ultrasonic stirring, etc. together with stirring by these stirring blades. The stirring power (net stirring power) may be conveniently determined from a net stirring torque obtained as a difference between a torque in a liquid stirring state and an axial torque in a blank rotation state at an identical rotation speed by using an actual stirring apparatus equipped with a stirring blade to be used. However, in order to exactly evaluate the influence on the stirring result of a change in net stirring power while eliminating an error due to an error in axial torque measurement, a stirring power Pv [W/m$^3$] and a stirring energy [kJ/m$^3$] per liquid unit volume were calculated via a stirring Reynolds number Re [-] and a stirring power number Np [-] obtained by using a vertical double flat paddle blade stirrer in Examples and Comparative examples described hereafter. The details of the measurement and calculation methods are described later.

The stirring power (net stirring power per unit volume of stirred liquid) may appropriately be set within a range of 5-10000 W/m$^3$, more preferably 15-8000 W/m$^3$. Below 5 W/m$^3$, it becomes difficult to stably accomplish the improvement in mechanical properties of the product lens represented by a modulus ratio (=rupture modulus/initial modulus) close to 1 and aimed at by the present invention, owing to the growth of the intermediate region (B) and it is also liable to cause a lowering in transparency of the product lens. On the other hand, in excess of 10000 W/m$^3$, it is liable to initiate polymerization in the stirring step or result in an unacceptable percentage of inferior product lenses due to remaining of bubbles which have not been removed by standing before the cast polymerization. It is also preferred to provide a stirring energy per unit volume of 5-20000 kJ/m$^3$, particularly 15-10000 kJ/m$^3$, to the stirred material liquid by the stirring. A preferred range of stirring Reynolds number Re [-] (=nd$^2$ρ/μ, n: stirring blade rotation speed [Vs], d=stirring blade diameter [m], ρ=stirring liquid density [kg/m$^3$], μ=stirring liquid viscosity [Pa·s], is 500-6000, corresponding to a neighborhood of the lower limit of the transitional region to the turbulent flow region.

[Polymerization]

A polymerization material liquid having secured a microscopic homogeneity owing to adequate control of the stirring conditions as described above, is then subjected to standing for about 5 seconds—about 60 minutes, cast into a lens mold for lens fabrication, and allowed to be polymerized and hardened. Instead of such polymerization performed in a mold, it is also possible to perform an ordinary lens production method known in the art, such as the spin cast process wherein a polymerization material liquid is placed in a one-side mold and then subjected to polymerization under a high-speed revolution. The polymerization may be performed under heating, or irradiation with lights of 600-100 nm (blue light, ultraviolet rays, excimer laser light, etc.), or with an electron beam. It is also possible to apply filtration for removing insoluble foreign matter, or deoxidization (nitrogen bubbling), in advance of the casting into a mold.

Examples of the above-mentioned thermal polymerization initiator may include: 2,2'-azobisisobutyronitrile, 2,2'-azobis(2,4-dimethylvaleronitrile), benzoyl peroxide, t-butyl hydroperoxide, cumene hydroperoxide, lauroyl peroxide, t-butyl peroxyhexanoate, 3,5,5-trimethylhexanoyl peroxide. These may be used singly or in mixture of two or more species. The amount of the radical polymerization initiator is about 0.001-2 parts, preferably 0.01-1 part, per 100 parts of the polymerization components.

The temperature for heating the polymerization component in a mold is at least 50° C., preferably 60° C. or higher, from the viewpoints of shortening polymerization time and reduction of residual monomer component. From the viewpoints of preventing deformation of the mold and suppressing volatilization of the polymerization components, the temperature is at most 150° C., preferably 140° C. or lower. The time for heating the polymerization component in the mold is at least 10 minutes, preferably 20 minutes or more, from the points of shortening of polymerization time and reduction of residual monomer component. From the point of preventing deformation of the mold, the time is at most 120 minutes, preferably 60 minutes or less. Temperature increase for the heating can be performed stepwise.

Examples of the above-mentioned photopolymerization initiator may include: phosphine oxide-type photopolymerization initiators, such as 2,4,6-trimethyl-benzoyl diphenyl-phosphine oxide (TPO), bis(2,4,6-trimethyl-benzoyl)-phenyl phosphine oxide; benzoin-type photopolymerization initiators, such as methyl orthobenzoyl benzoate, methylbenzoyl formate, benzoin methyl ether, benzoin ethyl ether, benzoin isopropyl ether, benzoin isobutyl ether, benzoin n-butyl ether; phenone-type photopolymerization initiators; such as 2-hydroxy 2-methyl 1-phenyl propane-1-one, p-isopropyl-α-hydroxy isobutyl phenone, p-t-butyltrichloracetophenone, 2,2-dimethoxy 2-phenyl aceto-phenone, α,α-dichloro 4-phenoxyacetophenone, N,N-tetraethyl-4,4-diaminobenzophenone; 1-hydroxycyclohexyl phenyl ketone; 1-phenyl-1,2-propanedione-2-(o-ethoxycarbonyl) oxime; thioxanthone-type photo polymerization initiators, such as 2-chloro thioxanthone, 2-methylthioxanthone; dibenzospharone?; 2-ethylanthraquinone; benzophenone acrylate; benzophenone; and benzil. These may be used singly or in mixture of two or more species.

It is also possible to use a photosensitizer together with a photopolymerization initiator. These photo polymerization initiator and photosensitizer may be used in a content of about 0.001-2 parts, preferably 0.01-1 part, per 100 parts of the polymerization components.

Two or more types of energies for polymerization can be used together, as by irradiating with light simultaneously with heating.

It is also possible to subject the lens taken out of the mold to after processing, such as periphery processing, as needed.
[Post-Processing]

The polymerization product after the polymerization from the mold may be immersed in distilled water, physiological saline, etc., to be swollen into a desired shape of ophthalmic lens material and simultaneously subjected to a hydration treatment for removal of non-polymerized polymerizable component and an organic solvent used in the polymerization. In the hydration processing, it is also possible to use a water-soluble organic solvent, such as acetone or lower alcohol in order to extract residual components.

In order to effectively remove elutable compounds as mentioned above, it is also possible to raise the temperature of the distilled water or physiological saline simultaneously with or after the hydration of the lens. The temperature may be appropriately set so as to allow the removal of residual material in a short time and below the deformation temperature of the ophthalmic lens material, e.g., 35-100° C.

Finally, it is also preferred to seal the lens hermetically in a lens vessel which can be a storage container lower than the inner height of the lens together with a physiological saline or a preservation solution containing a buffer agent, such as phosphoric acid, boric acid, and citrate, and subject it to irradiation with high-pressure steam or a gamma ray, etc. It is particularly preferred to perform the storage by using a preservation solution containing buffers, such as phosphoric acid, boric acid, and citrate, and especially preferably a phosphoric acid, after standing for at least one day after sterilization. This is effective for promoting further fixation of the regions formed in the lens obtained from the copolymer.
[Contact Lens]

The contact lens of the present invention manufactured preferably through the above-mentioned process is principally characterized in that it is formed of a copolymer having a region (A) which principally comprises a polymer of the component (I), an intermediate region (B) which comprises a copolymer of the component (II) and the component (III) but does not solvate with a hydrophilic solvent, and a hydrophilic region (C) which comprises a copolymer of the component (II) and the component (III), and that the intermediate region (B) shows a volume rate of 5 to 40% with respect to the region (A). If the volume rate is below 5%, the resultant lens lacks in the balance of mechanical properties (elastic moduli) aimed at by the present invention, and in excess of 40%, the resultant lens is caused to have lower softness and water content and also lacks in the balance of mechanical properties, due to relative shortage in proportion of the hydrophilic region (C). The volume rate of the intermediate region (B) with respect to the region (A) is preferably 8 to 25%. Preferred volume rates of the respective regions are: 1 to 40% for the region (A), 0.1 to 20% for the region (B), and 40 to 98.9% for the region (C); further preferably 10 to 35% for the region (A), 1 to 10% for the region (B), and 55 to 89% for the region (C).

Examples of the preferred properties of the contact lens of the present invention may include: a rupture (elastic) modulus of 0.1-0.5 $N/mm^2$, an initial (elastic) modulus of 0.1-0.5 $N/mm^2$, and a modulus ratio (=rupture modulus/initial modulus) of 0.8-1.2 [-], a stress relaxation coefficient of 8 to 25%, and an oxygen permeability coefficient Dk of at least $56 \times 10^{-11}$ $(cm^2/sec) \cdot (mLO_2/mL \times mmHg)$.

EXAMPLES

Hereinafter, the present invention will be described more specifically based on Examples and Comparative Examples. Characteristic values described herein inclusive of the following description are based on values measured by the following methods.
[Density]

The densities [$g/cm^3$] (=1000 $kg/m^3$) of material components and mixture solutions before polymerization were measured according to JIS Z8804-2012, and the densities [$g/cm^3$] (=1000 $kg/m^3$) of respective polymers for electron density calculation were measured according to JIS Z8807: 2012.
[Viscosity]

The viscosities [Pa·s] of mixture solutions before polymerization were determined according to JIS Z:8803 by first measuring a kinetic viscosity value [$mm^2 \cdot s$] by using a capillary viscometer (Cannon Fenske type, made by Shibata Scientific Technology Ltd.) having a model number giving a liquid flow-down time of 200 sec. or more for the liquid (e.g., No. 200 for Example 1) and multiplying the kinetic viscosity value with a density to obtain a viscosity at 20° C.
[Stirring Reynolds Number Re]

The number was calculated based on the following formula described on page 424 of "Chemical Engineering Handbook, 6th Edition", Published by Maruzen Co., Ltd. November (1999):

$$Re[-] = nd^2 \cdot \rho/\mu \quad (1),$$

Wherein n: stirring blades rotation speed [1/s], d: stirring blade diameter [m] stirring liquid density [$k/m^3$], and μ=stirring liquid viscosity [Pa·s].

For example, as for Example 1 described later, it was calculated as shown below based on n=5 rps, d=0.15 m for the stirring blade, and ρ=1010 [$kg/m^3$], μ=0.047 [Pa·s] for the polymerization material liquid, $$Re = (5.0)(0.15)^2(1010)/0.047 = 2.4 \times 10^3.$$

[Stirring Power and Stirring Energy]

A stirring power number Np [-] was determined by Formula (2) shown below based on research of Nagata, et al. based on stirring-power measurement using a vertical double flat paddle blade stirrer (refer to Nonpatent documents 2-4).

$$Np = A/Re + B(10^3 + 1.2Re^{0.66}/(10^3 + 3.2Re^{0.66}))^p \cdot (H/D)^{(0.35+b'/d)} \cdot (\sin\theta)^{1.2} \quad (2),$$

wherein D: stirring vessel inner diameter [m], H: stirred liquid depth [m], b': corrected stirring blade width [m] = $(n_p b)/2$ ($n_p$: number of stirring blades [–], b: stirring blade width [m]), and θ: stirring blade angle [°], A, B and p are constants of Formula (2) determined experimentally and summarized as follows:

$$A = 14 + (b'/D)(670(d/D-0.6)^2 + 185)$$

$$B = 10^{(1.3-4(b'/D-0.5)2-1.14(d/D))}$$

$$p = 1.1 + 4(b'/D) - 2.5(d/D-0.5)^2 - 7(b'/D)^4.$$

In the case of Examples and Comparative Examples where two ($n_p$=2) flat paddle blades of θ=90-degree were used, b'=$n_p$b/2=2b/2=b and $(\sin\theta)^{1.2}$=1, and the above-mentioned Formula (2) is reduced to the following Formula (2a). Further, in the case of Example 1 where 20-L (0.02-m³) of a stirred material liquid contained at a depth H=about 0.29 m in a cylindrical vessel of D=0.295-m, Re determined by formula (1) was substituted, whereby Np was calculated as follows:

$$Np = A/Re + B((10^3 + 1.2Re^{0.66}/(10^3 + 3.2Re^{0.66}))^p \cdot (H/D)^{(0.35+b/d)} \quad (2a),$$

wherein $A = 14 + (b/D)(670(d/D-0.6)2+185) = 33.38$ $$B = 10^{(1.3-4(b/D-0.5)2-1.14(d/D))} = 1.22$$

$$p = 1.14(b/D) - 2.5(d/D-0.5)^2 - 7(b/D)^4 = 1.51$$

As a result, $$Np = 33.38/2.4 \times 10^3 + \qquad (2a)$$
$$1.22\big((10^3 + 1.2Re^{0.66}/(10^3 + 3.2Re^{0.66})\big)^{1.51} \cdot$$
$$(H/D)^{(0.35+b/D)} = 0.85$$

From the above, a stirring power per material-liquid unit volume (Pv) for the material liquid with a volume v=0.02 [m³] was calculated as follows.

$$Pv = P/v = Np \cdot \rho n^3 d^5 / v =$$
$$0.85 \times 1010 \times 5^3 \times 0.15^5 / 0.02 = 8.19/0.02 = 407 W/m^3$$

Further, a stirring energy per material-liquid unit volume (Qv) for a stirring time of 20 minutes (=1200 seconds) was calculated as follows.

$$Qv = Pv \times t = 407 \times 1200/1000 = 489 \text{ kJ/m}^3.$$

[Appearance Evaluation of Material Liquid after Stirring]

A material mixture solution after stirring was allowed to stand still, and then 5 mL thereof was sampled in a clear glass vessel of 10 mL and subjected to the following observations.

<Bubble Evaluation>

Evaluated by observation with eyes according to the following standard:
A: 5 or less bubbles were observed in the vessel.
B: 50 or less bubbles were observed in the vessel.
C: Too many bubbles were present in the vessel, so that it could not be counted.

<Fluctuation Evaluation>

Estimated by observation with eyes of a 5-member panel based on the following standard:
A: All the members judged that it was a uniform solution.
B: One or two members among 5 members recognized optical heterogeneity.
C: All the members recognized optical heterogeneity.

[Small-Angle X-Ray Scattering Measurement]

Small-angle X-ray scattering intensities were measured in the region of dispersion vector $q(=(4\pi/\lambda)\cdot\sin\theta)=0.1-2$ [1/nm]. q was calibrated based on Chicken Tendon Collagen having a periodic structure of 65.3-nm which was commonly measured with various X ray beamlines used. (Referential document: Nonpatent document 1, pages 207 and 252.)

As described in the above referential document, the small-angle X-ray scattering measurement is one of the methods for higher-order structural analysis of polymer materials, and a small-angle X-ray scattering intensity from a phase separation structure is determined by an electron density difference between phase separation domains as indicated in the above-mentioned reference. Electron density is the number of electrons per unit volume of a sample, and is determined by calculation from the density of each phase separation domain.

<Small-Angle X-Ray Scattering Intensities of Material Mixture Solutions after Stirring>

As for material mixture solutions after stirring and before polymerization obtained in Examples and Comparative Examples, about 0.6 mL of each sample solution was sandwiched between a pair of 12.5 μm-thick polyimide films ("Kapton 50H", made by DuPont-Toray Co., Ltd.) and it was stacked in a plurality, if needed, to provide a 0.2 mm-thick sample, to which X-rays were incident at right angles to perform a small-angle X-ray radiation scattering measurement. The measurement was performed by using X-ray scattering beam lines BL11 (wavelength λ=0.1127 nm, energy: 11 keV) of Saga-prefecture Kyuusyuu Synchrotron and BL8S3 (wavelength λ=0.15 nm, energy: 8.26 keV) of Aichi synchrotron light center.

FIG. 1 shows a plot of small-angle X-ray scattering intensities of material mixture solutions after stirring and before polymerization obtained in Example 1 and Comparative Example 1 measured in a range of dispersion vector $q(=(4\pi/\lambda)\cdot\sin\theta)=0.1-2$ [1/nm], wherein λ: irradiation X-rays wavelength and 2θ: scattering angle. The plot for Comparative Example 1 clearly shows the presence of phase separation domains of about 40 nm corresponding to q=0.17 [1/nm]. In the following Examples and Comparative Examples, relative dispersion intensity ratios were recorded as a measure of homogeneity of respective material mixture solutions before polymerization with respect to the scattering intensity (set to 1) of that of Comparative Example 1 at q=0.17 [1/nm].

<Volume % of Intermediate Region (B) in a Copolymer>

Copolymer samples formed into a lens-equivalent shape with a diameter of 14 mm and a thickness of about 0.1 mm in respective Examples and Comparative Examples, stored in a preservation liquid containing a phosphoric acid buffer and subjected to high pressure-steam sterilization, were subjected to analysis of internal phase separation structures. More specifically, copolymer samples for each Example were respectively immersed in a plurality of polar solvents comprising water, methanol and solution mixtures of these, i.e., 11 types polar solvents having water/methanol volume ratios of (1) 100/0, (2) 90/10, (3) 80/20, (4) 70/30, (5) 60/40, (6) 50/50, (7) 40/60, (8) 30/70, (9) 20/80, (10) 10/90, and (11) 0/100, each in a volume not obstructing a saturated swelling of the copolymer sample, for substitution with respective solvents, were subjected to the small-angle X-ray scattering measurement. Each swollen polymer sample was sandwiched between a pair of 12.5 μm-thick polyimide films ("Kapton 50H", made by DuPont-Toray Co., Ltd.) for preventing the evaporation of the solvent during the small-angle X-ray scattering measurement. The measurement was performed by using X-ray scattering beam lines, BL6A and BL9C of High-energy Accelerator Research Organization, Material Structure Science Laboratory, Photon Factory PF, and BL40B2 of the Large-scale Synchrotron Radiation Facility (Spring 8) managed by Japan Synchrotron Radiation Research Institute, under the following conditions.

The used synchrotron acceleration X-ray having an appropriately selected wavelength of 0.1 nm or 0.15 nm (energy: 12.4 keV or 8.26 keV), was incident at right angles to a central region of about 200 μm-square of a swollen sample and detected by a detector disposed 2-3 m distant from the sample for measuring the number of scattered photons.

Figure 2:
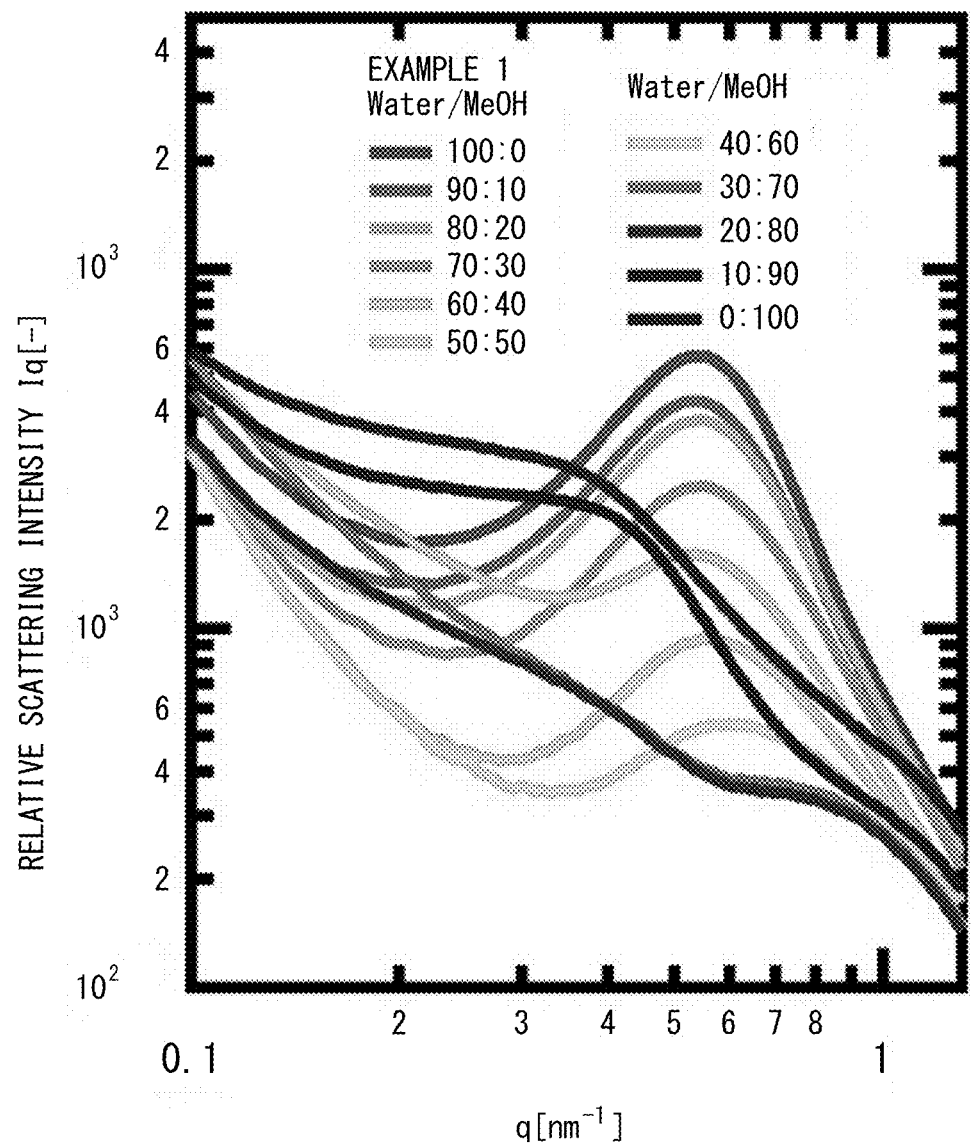
FIG. 2 is a small-angle X-ray scattering intensity profile of swollen objects formed by immersing a contact lens-shaped product of a copolymer obtained in Example 1 described hereafter in 11 mixture solvents having different water/methanol ratios.
Figure 3:
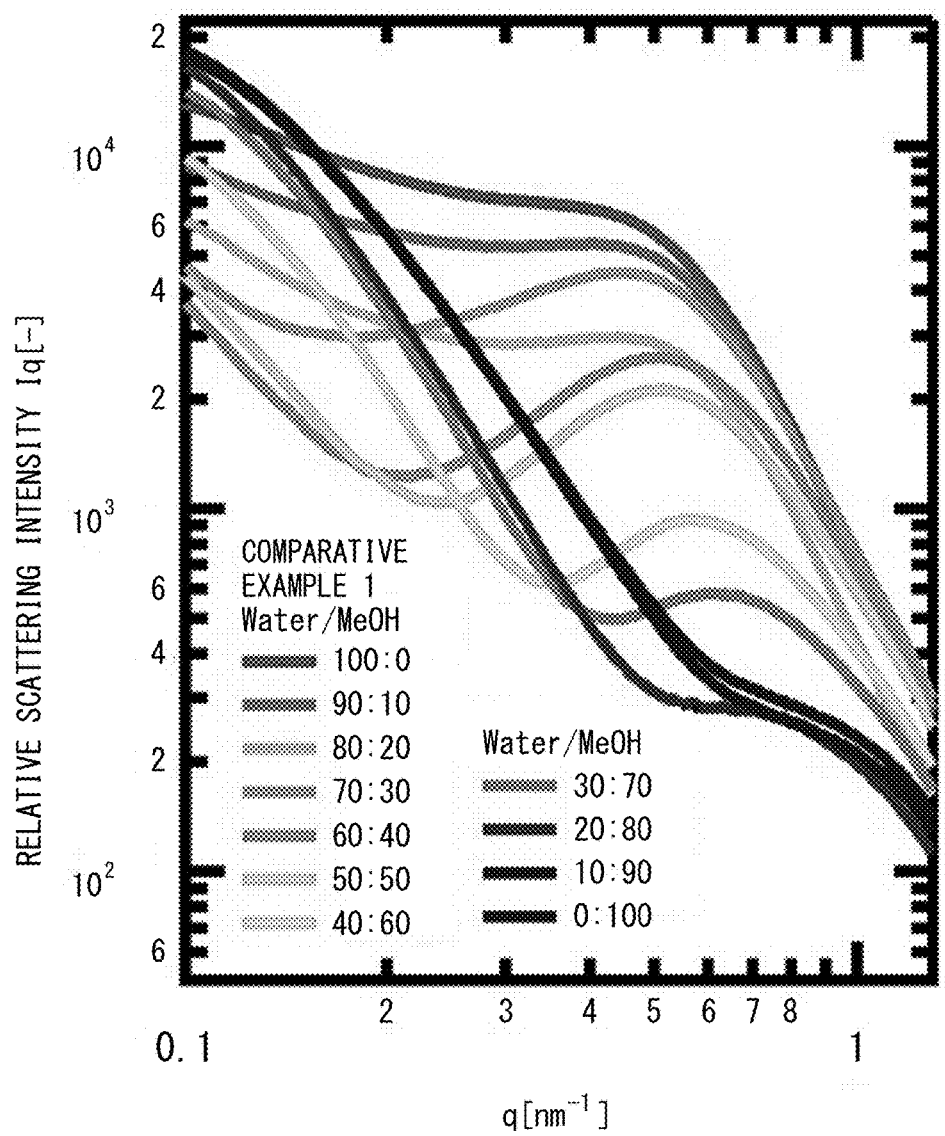
FIG. 3 is a small-angle X-ray scattering intensity profile obtained by using a copolymer obtained in Comparative Example 1 described hereafter.

FIGS. 2 and 3 show small-angle X-ray scattering intensity profiles obtained in a dispersion vector range of q=0.1-1.3 [l/nm] of swollen samples (1)-(11) formed by swelling lens-shaped samples each having a diameter of 14 mm and a thickness of about 0.1 mm of copolymer samples obtained in Example 1 and Comparative Example 1, respectively, described hereafter, in the above-mentioned 11 types of solvents, respectively.

A process for determining the volume rate of the intermediate region (B) of the copolymer sample obtained in Example 1 by using the data obtained as described above, will be described below.

Such a regional volume rate determination process is based on a knowledge obtained through the microstructural analysis including small-angle X-ray scattering analysis and EDS analysis (energy dispersion-type spectrum analysis) based on STEM (scanning transmission electron microscope) performed by the present inventors that the silicone hydro-gel copolymer obtained by copolymerization of the above-mentioned components (I)-(III) consists of:

Region (A): a region which consists of a macro monomer and contains almost no water or methanol,
Region (B): a region which consists of similar components as Region (C) but hardly contains a solvent due to an influence of Region (A), and
Region (C): a region which consists of a hydrophilic monomer and solvates with water or methanol.

Figure 4:
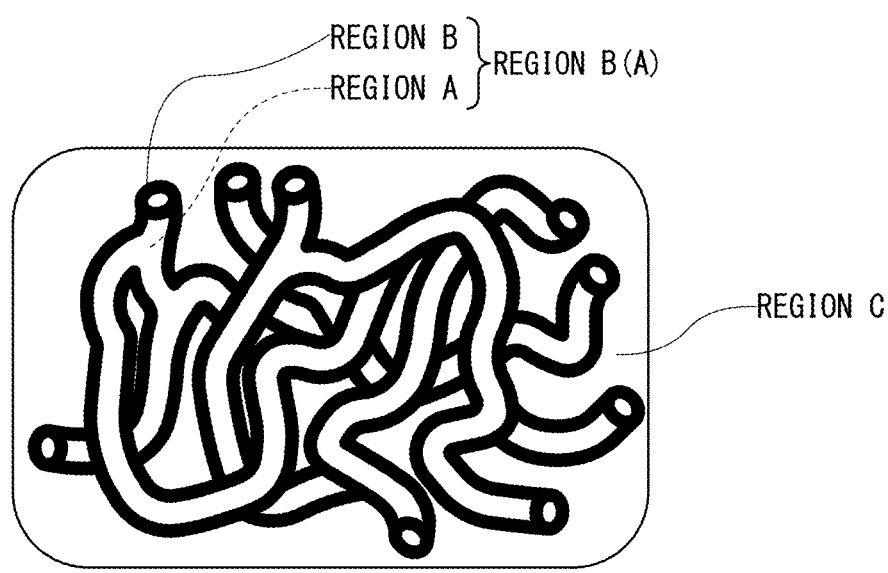
FIG. 4 is a conceptual diagram of a core-shell cylinder model assumed in order to calculate the volume rate of an intermediate region (B) about copolymers obtained in Examples and Comparative Examples based on small-angle X-ray scattering intensity profiles.

The thus-confirmed micro structure of the silicone hydro-gel copolymer is presumed to be approximated by a core-shell cylinder model as shown in FIG. 4 wherein Region C and Region B (A) (that is, Region A coated with Region B) forms a co-continuous structure.

A total small-angle X-ray scattering intensity Q from a phase-separation structure is determined as a square of a product of an electron density difference between respective phase separation domains and volume fractions of the respective domains. More specifically, a small-angle X-ray scattering intensity Q from a phase-separation structure material including three phase separation regions (domains) of regions A, B and C satisfies a proportional relationship of the following formula (3) (corresponding to formula (7) on page 5446 of Nonpatent document 5):

$$Q = 2\pi^2 \cdot (\Delta\rho_{A\,B})^2 \cdot \varphi A \varphi B + (\Delta\rho_{A\,C})^2 \cdot \varphi A \varphi C + (\Delta\rho_{B\,C})^2 \cdot \varphi B \varphi C \quad (3),$$

wherein $\Delta\rho_{A\,B}$: an electron density difference between region A and region B, $\Delta\rho_{A\,C}$: an electron density difference between region A and region C,
$\Delta\rho_{B\,C}$: an electron density difference between region B and region C,
φA: a volume fraction of region A,
φB: a volume fraction of region B,
φC: a volume fraction of region C.

As mentioned above, a polymer sample is swollen with a multiplicity of water/methanol mixture solvents having different methanol contents in order to measure the scattering intensity profiles of the swollen polymer samples. The changes in measured scattering intensity profiles are confirmed corresponding to changes in degree of selective swelling of the region (C), and a region (B)/region (A) volume ratio κ is varied to calculate complex electron densities according to the above formula (3), and accordingly scattering intensity profiles corresponding thereto. Finally, the calculated scattering intensity profiles are compared with the measured scattering intensity profiles to determine an objective region (B)/region (A) volume ratio κ based on a value κ giving an agreement between them.

Electron density is the number of electrons per unit volume of a sample, and is measured by calculation from the density of each phase separation domain. More specifically, based on denotation of Avogadro number as $N_A (=6 \times 10^{23})$, an electron density ρex [unit: $N_A/cm^3$] of material X (having a formula mass: Mx, a mass density: ρmx, and a number of electrons in 1 mol (=a total of atomic numbers of constituents): Nx) constituting each domain, is determined by a following formula:

$$\rho ex = \rho mx \times Nx / MX \quad (4).$$

Therefore, electron densities ρe [$N_A/cm^3$] of water and methanol in the above-mentioned solvents and materials used in Example 1 described later, for example, are calculated from formula masses, Nx, and densities or densities of respective component polymers:

Water (formula mass: 18, density: 1.00, Nx: 10): ρew=0.556,
Methanol (formula mass: 22, Density: 0.79, Nx: 18): ρem=0.445,
Macromer a (formula mass as poly dimethylsiloxane unit: 74.16, density: 0.96, Nx: 40): ρema=0.518
Poly TRIS-MA(formula mass: 423, density: 0.953, Nx: 230): ρet=0.517
Poly NMMP(formula mass: 111, density: 1.20, Nx: 60): ρen=0.649.

In Example 1, Component (I): macromer a (as region (A)-forming component) is used in 40 mass parts, Component (II): NMMP is used in 20 mass parts and Component (III):TRIS-MA is used in 40 mass parts, respectively as ratios. Accordingly, volume fractions of these components in a dry state are estimated to be fractions of these in a polymer formed of respective monomers (i.e., charged weights× monomer densities), thus 0.4023:0.3945:0.2032, and the composite electron density of the NMMP-TRIS-MA polymer which constitutes regions (B) and (C) is calculated at (0.649×0.40+0.517×0.20)/(0.40+0.20)=0.604.

Table 1 appearing at the end shows a process for calculating composite electron densities of swollen polymer sample (1)-(11)—obtained from the copolymer of Example 1 based on the above-mentioned data.

The calculation process shown in Table 1 and a method of determining an intermediate region (B)/hydrophobic-region (A) volume ratio κ will be explained sequentially hereafter.

The swollen polymer samples (1)-(11) were each subjected to the following operation and calculation. The process about the swollen sample (1) is explained sequentially in the following.

I. A diameter after swelling is divided by a diameter before swelling to obtain a one-dimensional swelling rate, which is then cubed to obtain a volume swelling rate=1.482.

II. A volume fraction φA of region A in the swollen sample is calculated as a volume fraction of macro monomer a in a dry state (=0.4023)/1.482=0.2715.

III. A volume fraction φB of region B in the swollen sample is calculated by using a tentatively assumed intermediate region (B)/hydrophobic-region (A) volume ratio κ. An outline of this simulation calculation is a process of repeatedly calculating composite electron density corresponding to a total scattering intensity while fluctuating κ to find a volume ratio κ=φB/φA which gives a 3-region composite electron density conforming to an integral scattering intensity based on an actually measured scattering intensity. Table 1 shows a collection of data obtained by performing a series of calculation described below based on a fixed vale of κ=0.118 obtained by the above-mentioned simulation calculation. More specifically, Table 1 shows values associated with the calculation of φB=φA (=0.2715)× κ(=0.118)=0.0320.

IV. Volume fraction φC of region C is calculated as 1−φA−φB=0.6965 based on the above-mentioned result.

V. Volume fraction φCsolvent of the solvent in region C is determined as 1−1/Volume swelling rate (=1.482)=0.3252.

VI. Volume fraction φCpolymer of polymer in region C is determined as φC(=0.6965)−φCsolvent (=0.3252)=0.3712.

VII. From the results in above-mentioned V. and VI., if the fractions of polymer and solvent in region C are distributed so that the sum of the fractions becomes 1, they are calculated as 0.3712/(0.3712+0.3252)=0.5330 and 0.3252/(0.3712+0.3252)=0.4670.

VIII. Accordingly, since the composite electron density of the NMMP-TRIS-MA polymer constituting region C (and B) is 0.604 and the composite electron density of water/methanol (100/0) solvent is 0.554, the composite electron density of region C is calculated at 0.604×0.5330+0.554×0.4670=0.5807.

IX. By substituting electron density ρeA=0.518 and volume fraction φA=0.2715 of region A constituted by macro monomer A, composite electron density ρeB=0.604 of region B constituted by NMMP-TRIS-MA polymer and volume fraction φB=0.0320 obtained in above III., and electron density ρeC=0.5807 and volume fraction φC=0.6965 of region C obtained in above V. and VIII., respectively, into the above-mentioned formula (3), a 3-region composite electron density Qc corresponding to the total scattering intensity Q is calculated by the following formula:

$$Qc = 2\pi^2 \cdot \{(\Delta\rho_{AB})^2 \cdot \varphi A \varphi B + (\Delta\rho_{AC})^2 \cdot \varphi A \varphi C + (\Delta\rho_{BC})^2 \cdot \varphi B \varphi C\}$$

$$= 19.72 \times \{(0.518 - 0.604)^2 \times 0.2715 \times 0.0320 + (0.518 - 0.5807)^2 \times 0.2715 \times 0.6965 + (0.604 - 0.5807)^2 \times 0.0320 \times 0.6965\}$$

$$= 19.72 \times \{0.007396 \times 0.008688 + 0.00393 \times 0.1890 + 0.000497 \times 0.0223\}$$

$$= 19.72 \times \{0.0000643 + 0.007428 + 0.0000111\}$$

$$= 19.72 \times 0.000818 = 0.0162$$

As shown above, the 3-region composite electron density of the swollen sample (1) obtained by swelling with a water/methanol (100/0) solvent is calculated at 0.0162.

X. The above calculation is repeated with respect to swollen samples (2)-(11) having different water/methanol ratios while maintaining an identical value of κ(=0.118 in Table 1), whereby a group of composite electron density values at an assumed κ value (=0.118) as represented by those shown in a column next to the rightmost column in Table 1, and these values are respectively divided by the largest value given by the swollen sample (1) to provide normalized electron densities shown in the rightmost column in Table 1.

XI. The above-mentioned values shown in Table 1 are results of calculation based on a finally determined value of κ=0.118, whereas an initial stage calculation based on a tentatively assumed value of κ can only provide a group of normalized electron density values ci (i=1-11) which are naturally different from the above. Therefore, it is necessary to compare these values with actually measured small-angle X-ray scattering profiles shown in FIG. 2 for calibration. For this purpose, Scattering intensities Iq shown in FIG. 2 are integrated according to Formula (4) (identical to Formula (9) on page 5447 of Nonpatent document 5).

$$Q \propto \int_{0.1}^{1.3} I(q) q^2 dq \tag{4}$$

The results of the integration are shown in Table 3 at the end. The integrated values are normalized with respect the maximum integral value of the swollen sample (1) and shown as Normalized integrated values Qmi (i=1-11) in the rightmost column of Table 3.

XII. Then, the calculation explained above with reference to Table 1 is repeated while fluctuating κ to determine a value of κ giving a minimum of $\Sigma(Qmi-Qci)^2$ (i=1-11) as an objective region (B)/region (A) volume ratio κ. As mentioned above, Table 1 lists the results of the series of calculations based on the thus-determined κ=0.118.

Figure 5:
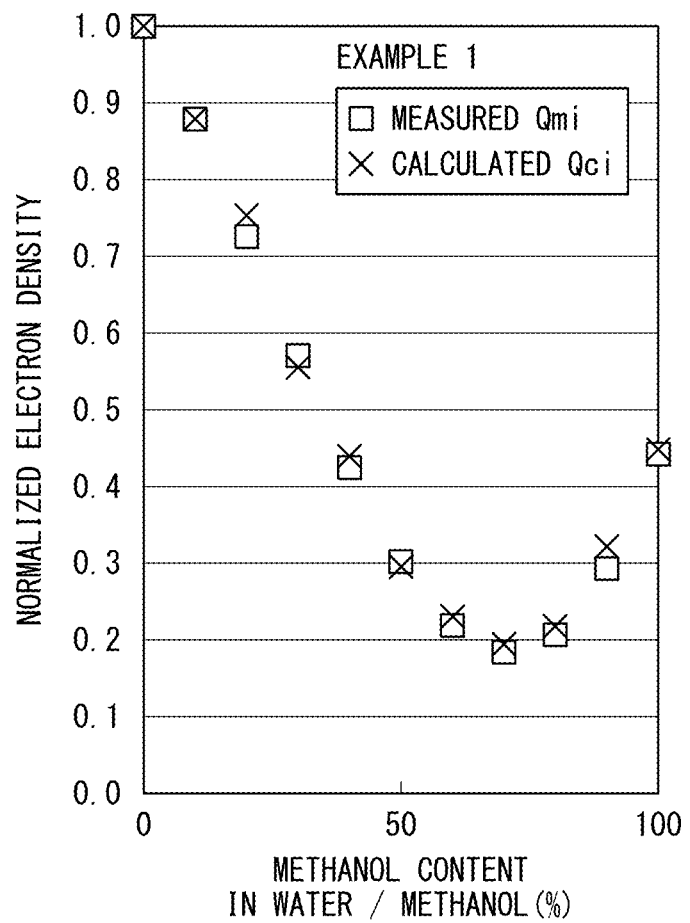
FIG. 5 is an electron density plot which shows concordance between calculated normalized electron-density $Q_{ci}$ based on the core shell cylinder model and normalized integral value $Q_{mi}$ based on the measured small-angle X-ray scattering intensity profile of the copolymer of Example 1 described hereafter.

FIG. 5 shows plots of the calculated normalized electron-density values Qci listed in the rightmost column of Table 1 and the normalized integral values Qmi in Table 3. Very good concordance between the two types of data is observed, and this is believed to prove the correctness of the core-shell cylinder model as shown in FIG. 4, and the correctness of the calculation process of the A, B and C 3-region composite electron densities and of the region (B)/region (A) volume ratio κ based on the core-shell cylinder model.

Lens-shaped silicone hydro-gel polymer samples were prepared from quite the same starting mixture material as Example 1 under the productions conditions of Comparative Example 1 which were quite the same as those in Example 1 except for changing the stirring conditions before the cast polymerization and subjected in the same manner to the test for determining the region (B)/region (A) volume ratio κ. Table 2 shows a list of the calculation results corresponding to κ=0.04 thus determined. The scattering profiles for Comparative Example 1 are shown in FIG. 3, and the integrated values and normalized integrated values thereof are shown in Table 4 at the end hereof.

Figure 6:
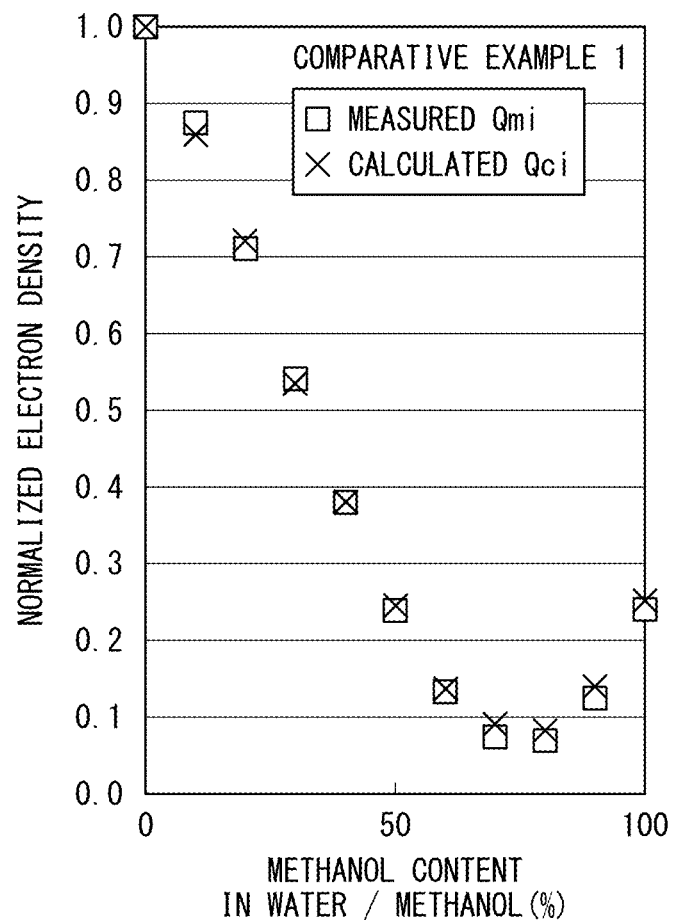
FIG. 6 is an electron density plot which shows concordance between $Q_{ci}$ and $Q_{mi}$ about Comparative Example 1 described hereafter.

FIG. 6 shows plots of the calculated normalized electron-density values Qci listed in the rightmost column of Table 2 and the normalized integral values Qmi in Table 4. Again, very good concordance between the two types of data is observed, and this is believed to prove the correctness of the core-shell cylinder model as shown in FIG. 4, and the correctness of the calculation process of the A, B and C-3 region composite electron densities and of the region (B)/region (A) volume ratio κ based on the core-shell cylinder model, also in Comparative Example 1.

[Evaluation of Lens-Shaped Products]

Lens-shaped products (each having a shape of contact lens of 14 mm in diameter and 0.08 mm in center thickness) obtained in Examples and the Comparative Examples were each subjected to extraction, hydration, and sterilization processing in a preservation solution containing a phosphoric acid buffer, followed by storing together with a preservation solution containing a phosphoric acid buffer in a lens container for more than one day, and then subjected to the following evaluation.

<<Appearance Evaluation>>

Each lens taken out of the container was observed with naked eyes.

<Appearance (Transparency)>

Evaluated according to the following standard based on visual judgment by a five-member panel.

A: All the 5 members judged that the lens was transparent.

B: Three or more among the 5 members judged that lens presented turbidity and was difficult to use as an optical product.

C: All the 5 members judged that the lens presented turbidity and could not bear the use as an optical product.

<Appearance (Entrainment of Bubbles)>

Evaluated according to the following standard based on visual judgment by observation of 10 lens sheets.

A: One or less sheet entrained air bubbles.

B: Four to six sheets entrained air bubbles.

C: All the lens sheets were recognized to entrain air bubbles.

[Feel]

Evaluated according to the following standard based on the results of feel when a lens sample was nipped by fingers of a five-member panel.

A: All the 5 members felt a similar softness as a silicone-free hydro-gel lens.

B: Three or more among the 5 members judged that it was harder than the hydro-gel lens.

C: All the 5 members judged that it showed a hardness liable to damage eyeball surface by rubbing when it was worn as a soft lens.

[Oxygen Permeability Coefficient]

A current value of a lens in a physiological saline solution at 35° C. was measured by using a Seikaken-type film oxygen permeability meter made by Rika Seiki Kogyo K.K. according to the electrode method described in ISO18369-4:2006 (E).

More specifically, sample lenses of an identical shape prepared in Examples and Comparative Examples were subjected to measurement of a current value proportional to an oxygen permeability in a physiological saline solution by using "asmofilcon A", a registered name in U.S. FDA, (made by Menicon Co., Ltd.; Dk value (extrapolated value to an infinite thickness, determined according to a method described in Nonpatent document 6): $129\times10^{-11}(cm^2/sec)\cdot(mLO_2/mL\times mmHg)$, lens diameter (Dia): 14.0 mm, base curve (BC): 8.60 mm, prescription (P): 3.00 and central-part thickness (CT): 0.08 mm) as a reference lens. After confirming the atmospheric pressure at the time of measurement, the oxygen permeability coefficient Dk values (unit: $\times10^{-11}(cm^2/sec)\cdot(mLO_2/mL\times mmHg)$) of a sample lens was determined from the measured current values (IW and IS) of the reference lens and the sample lens according to the following formula:

$$Dk=W\times(IS/IW)\times(TS/TW)\times(PW/PS)$$

W: Dk value of the reference lens $(=129\times10^{-11}(cm^2/sec)\cdot(mLO_2/mL\times mmHg))$ IS: Current value of the sample lens (µA)

IW: Current value of the reference lens (µA),

TS: Thickness (mm) of the sample lens <0.08-mm>

TW: Thickness (mm) of the reference lens <0.08-mm>,

PS: Atmospheric pressure (mmHg) at the time of the sample lens measurement,

PW: Atmospheric pressure (mmHg) at the time of the reference lens measurement.

The Dk value represents an oxygen permeation capability through a lens for alleviating interception of oxygen supply to eye by a contact lens. Generally speaking, it is said that the Dk value is preferably at least $24\times10^{-11}$ $(cm^2/sec)\cdot(mLO_2/mL\times mmHg)$ for wearing for a whole day and is preferably at least $56\times10^{-11}(cm^2/sec)\cdot(mLO_2/mL\times mmHg)$, further preferably $69.6\times10^{-11}(cm^2/sec)\cdot(mLO_2/mL\times mmHg)$ or higher, for allowing a continuous use, in case where the lens central-part thickness is assumed to be 0.08 mm of a general-purpose soft contact lens.

[Measurement of a Rupture Modulus]

Figure 7:
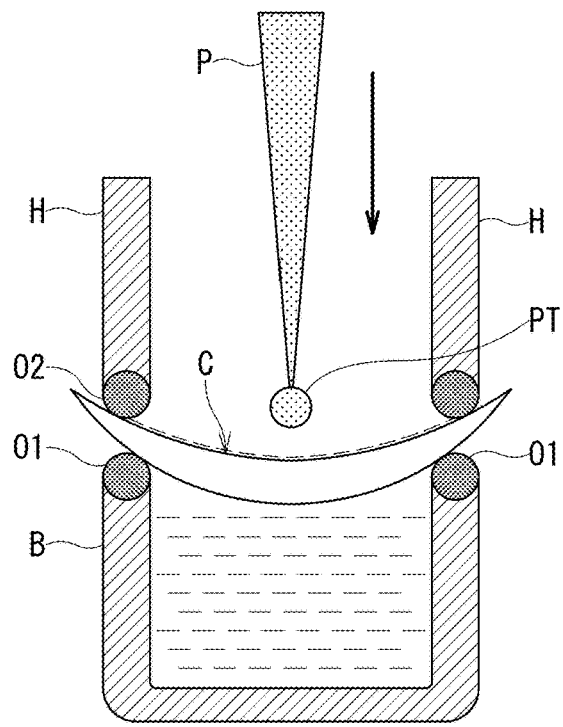
FIG. 7 is a schematic diagram showing a sample arrangement state for measuring three-dimensional rupture moduli of lens-shaped copolymers of Examples and Comparative Examples.

FIG. 7 is a schematic cross-sectional view showing a sample arrangement state in an apparatus for measuring rupture characteristic (elastic modulus) of a lens-like shaped body in a thermostat chamber at 25° C. As shown in FIG. 7, a physiological saline solution was filled in a cylindrical cell B for sample fixation, on an upper end frame of which an O ring O1 having a diameter Do (=9.7 mm), a little smaller than a lens sample, had been disposed. A lens sample C of which a base curve BC (mm) had been measured beforehand was placed on the O ring D1 of the cell B, and pressed with a holder H (forming an upper half of the cell B) having an O ring O2 with an identical diameter Do at its lower end, whereby the lens sample C was fixed. Then, about 0.5 mL of a physiological saline solution was dropped on the sample C, to place the sample C in a physiological saline solution environment. The cell B having thus fixed sample C was installed in an up-and-down type strength test apparatus ("AG-IS MS type" made by Shimadzu Corporation). In this state, a motor of the apparatus was turned on to cause a press pin P having a tip PT of 1/16 inch in diameter to descend at a rate of 20 mm/min towards the center of the sample C (FIG. 7), thereby evaluating three-dimensional rupture characteristics including measurement and recording of the changes in position of tip PT of the press pin and load applied therefrom to the sample C.

In addition, a BC value (a base curve, i.e., a concave surface-side curvature radius) of contact lens in a physiological saline solution by using a contact lens analyzer (Model JCF/TCU, made by Optimec Co.) according to ISO18369-3, 2006.

The elastic modulus measured by the apparatus of FIG. 7 is a value obtained by dividing a load (a deformation stress applied to a lens) impressed per concave-side unit surface area of the lens by a distortion (–) of the lens caused by the applied load application, and is calculated by the following formula.

Elastic modulus $(mN/mm^2)$ = (5)

((load (N)/lens-surface area $(mm^2)$)/lens distortion) × 1000 =

(stress $(N/mm^2)$)/lens distortion) × 1000

Figure 8:
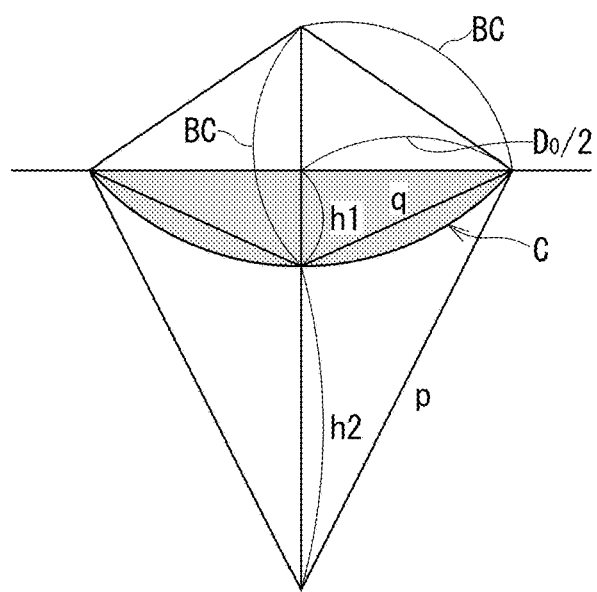
FIG. 8 is a schematic diagram for illustrating deformation parameters under measurement of the lens C shown in FIG. 7.

Herein, referring to FIG. 8 which is a schematic diagram for illustrating a deformation state under measurement of the lens C shown in FIG. 7, the surface area indicated by a shadow of the lens C is calculated by way of a calculation of a partial surface area of a spherical object using the base curve BC, the O-ring diameter Do and the front end position of the press pin h1 ($=(BC)-\{(BC)^2-(Do/2)^2)\}^{1/2}$)) according to the following formula:

$$\text{Lens surface area (mm)} = 2\times\pi\times(BC)\times h1 = \\ 2\times\pi\times(BC)\times\{(BC)-((BC)^2-(Do/2)^2)^{1/2}\} \quad (6)$$

Further, the distortion is calculated as a ratio between a value p at the time of load impression and an initial value q of diameter direction length of the lens and by including a front end position h2 at the time of load impression of the press pin P according to the following formula:

$$\text{Lens distortion}=p/q=\{(Do/2)^2+(h1+h2)^2\}^{1/2}/\{(Do/2)^2+h1^2)\}^{1/2} \quad (7)$$

<Rupture Elastic Modulus>

A distortion calculated by the above-mentioned formula (7) from the load at the time of a sample rupture (N) and the changed end position h2 of the press pin, and the distortion and a surface area calculated by formula (6) were substituted in a formula (5a) shown below obtained by modifying the above-mentioned formula (5) to calculate an elastic modulus at the time of rupture:

$$\text{Rupture elastic modulus (mN/mm}^2\text{)=(load at the time of rupture (N)/lens-surface area (mm}^2\text{))/distortion at the time of rupture)}\times 1000 \quad (5a)$$

<Initial Elastic Modulus>

A lens distortion at the time of 0.1N load was calculated by formula (7) from the chart obtained during the above-mentioned rupture modulus measurement, and an initial elastic modulus was calculated as follows based on the 0.1N load, the distortion at the load (0.1N) and the lens surface area obtained above:

$$\text{Initial elastic modulus (mN/mm}^2\text{)=(load (0.1N)/lens-surface area (mm}^2\text{))/distortion at the 0.1N load)}\times 1000.$$

The initial elastic modulus serves as an index showing a material characteristic of a lens when the load of eyelid pressure (0.1N) is applied to the lens in case where the contact lens is worn, and a value of about 0.1-0.5 N/mm$^2$ is generally considered appropriate.

<Elastic-Modulus Ratio>

An elastic-modulus ratio is calculated as a ratio of the rupture elastic modulus to the initial elastic modulus, obtained above, according to the following formula:

$$\text{Elastic-modulus ratio=rupture elastic modulus/initial elastic modulus.}$$

A characteristic feature of the contact lens of the present invention is that it has a value of this elastic-modulus ratio of 0.8-1.2, close to 1. This means that the contact lens of the present invention has an initial elastic modulus and a rupture elastic modulus close to each other and shows a dynamic characteristic representing a constant level of stress relaxation. In case where a polymer product like a contact lens deforms, the fact that an initial dynamic behavior and a dynamics behavior at the time of rupture are equal to each other, means that the polymer material in the lens is homogeneous. Some of ordinary contact lenses can show a small elastic modulus in an early stage of deformation and a larger elastic modulus at a large degree of deformation due to a full stretching of a polymer fraction between non-uniform crosslink points. On the other hand, in case where polymer sites of a high crosslink density in a non-uniform portion exhibit a predominant behavior, it can show a smaller elastic modulus at the time of rupture compared with an initial elasticity modulus. Thus, even such apparently transparent and uniform contact lens materials may still exhibit various characteristics with respect to initial elastic modulus and rupture elastic modulus. Accordingly, a ratio between the two moduli can be an index of uniformity of the contact lens materials.

Figure 9:
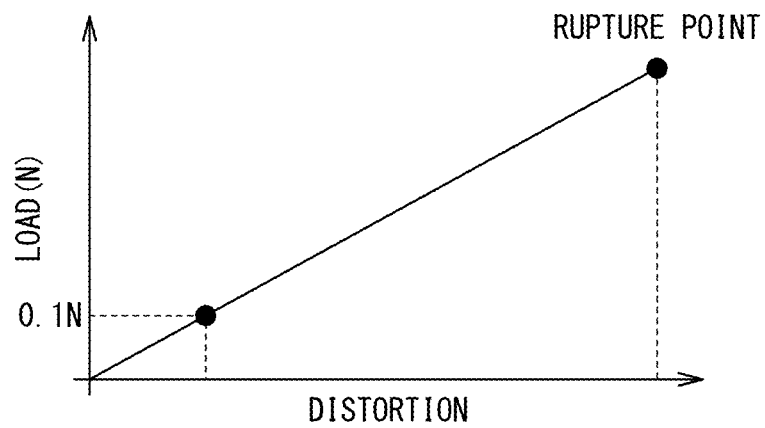
FIG. 9 is a schematic diagram showing a load-distortion curve under modulus measurement of a lens by an Example.
Figure 10:
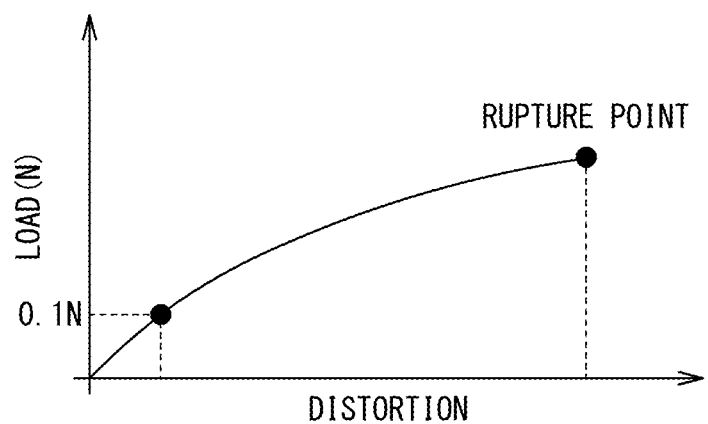
FIG. 10 is a schematic diagram showing a load-distortion curve under modulus measurement of a lens by Comparative Example 1.
Figure 11:
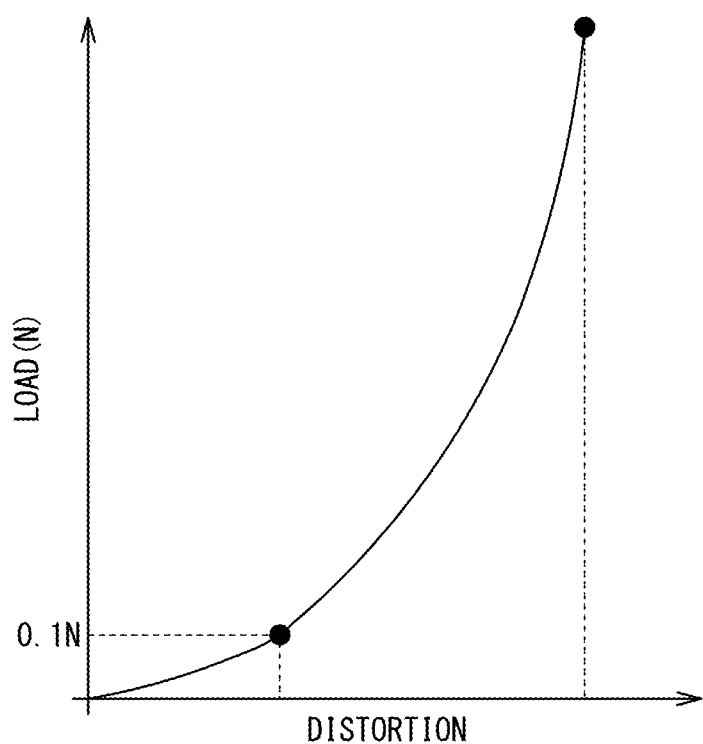
FIG. 11 is a schematic diagram showing a load-distortion curve under modulus measurement of a lens by Comparative Example 4.

Incidentally, the load-distortion curve of the lenses as embodiments of the present invention showing the above-mentioned characteristic is schematically represented as shown in FIG. 9, and the load-distortion curves of the lenses obtained by Comparative Examples 1 and 4 are schematically represented in FIGS. 10 and 11, respectively.

<Stress Relaxation Coefficient>

A sample was set similarly as in the elastic modulus measurement and subjected to a programmed operation including descending of a press pin P to contact a lens sample C down to a position where a stress (initial stress) of about 0.1 N/mm$^2$ was applied to the sample and then holding the press pin P at the position for 1 minute, and a stress after lapse of 30 seconds was measured. A stress relaxation coefficient was calculated according to the following formula:

$$\text{Stress relaxation coefficient (\%)}=(A-B)/A\times 100$$

A: Initial stress (=0.1 N/mm$^2$)
B: Stress 30 seconds after the holding (N/mm$^2$).

Generally, the stress relaxation coefficient is preferably within the range of 8 to 25%. Below 8%, a repulsion by a lens is strong and possibly results in a poor feeling of wearing and also a liability of leading to the anterior eye segment barrier. On the other hand, in excess of 25%, a return of the lens becomes poor, and at the time of wearing, a deformation of the lens is liable to remain after eyeblink and result in a delay in restoration of a visual field after opening eyelids.

<<Materials>>

In Examples and Comparative Examples, compounds shown below in abbreviation were used as starting materials for lens production.

[Component (I)]

Macro monomers a-d corresponding to Component (I) of the present invention was produced as follows.

(Production of Macro Monomer a)

(1) In a reaction vessel were placed 2223.0 g of isophorone diisocyanate (hereafter abbreviated as IPDI), 19.2 g of 1%-iron (III) acetylacetonate solution in acetonitrile as a catalyst and 1496.0 g of n-hexane, and stirring was started at a set bath temperature of 70° C. Then, 9656.9 g of a both-terminal hydroxylated dimethylsiloxane (polymerization degree: 40, hydroxyl equivalent: 1560 g/mol; "KF-6002" made by Shin-Etsu Chemical Co., Ltd.) was added in 4 divisions, and after the final addition, stirring was continued for 2 hours at a kept temperature of 70° C. for reaction, followed by cooling.

When the liquid temperature reached 55° C. or less, 1626.0 g of 2-hydroxyethyl acrylate (hereafter called HEA), 38.5 g of 1%-iron (III) acetylacetonate solution in acetonitrile and 8.13 g of p-methoxy phenol (hereafter called MEHQ) as a polymerization inhibitor were added to the reaction layer. After stabilization of temperature increase due to reaction and 60 minutes of stirring for reaction at a liquid temperature of 50° C., the bath temperature was set at 70° C. and sampling was performed as required. FT/IR measurement was performed for determination of an end point of the reaction based on the degree of disappearance of a peak (at 2230-2320 cm$^{-1}$) attributable to the N=C=O group in the starting material (whereby the reaction was continued for about 3 hours after the liquid temperature reached 70° C.).

The reaction layer was cooled, and while about 28 kg of n-hexane and 12 kg of acetonitrile were added thereto for dilution, the content was transferred to the extract layer. The liquid of the extract layer was stirred and allowed to stand at room temperature for 1 hour to visually confirm the separation into an acetonitrile layer and a macro monomer/n-hexane layer, and the acetonitrile layer was discharged. Then, about 9 kg of acetonitrile was added and stirred, followed by standing at room temperature for 1 hour to visually confirm the separation into an acetonitrile layer and a macromer/n-hexane layer, and then the acetonitrile layer was discharged. The n-hexane layer finally obtained was recovered and condensed at 30° C. and under a reduced pressure of 15 kPa. Finally, it was condensed at 10 kPa overnight to recover macro monomer a which was a slightly yellowish viscous transparent liquid and showed a number-average molecular weight of 6,300. (Yield: 80%).

The macro monomer a after purification was characterized as follows.
$^1$H NMR (CDCl$_3$, δ ppm)
0.06 (Si—CH$_3$, 3H, m)
0.52 (Si—CH$_2$, 2H, m)
2.91 (NH—CH$_2$, 2H, d)
3.42 (—O—CH$_2$, 2H, t)
3.61 (—O—CH$_2$, 2H, m)
4.18~4.34 (—(O)CO—CH$_2$—, 6H, m)
4.54 (NH, 1H, s)
4.85 (NH, 1H, s)
5.84 (CH=, 1H, dd)
6.14 (CH=, 1H, dd)
6.43 (CH=, 1H, dd)
FT/IR (cm$^{-1}$)
1262 and 802 (Si—CH$_3$)
1094 and 1023 (Si—O—Si)
1632 (C=C)
around 1728 (C=O, ester and urethane)

The $^1$H-NMR analysis and FT/IR analysis were carried out by the following methods, respectively.
(a)$^1$H-NMR analysis: Fourier transform NMR (nuclear magnetic resonance) apparatus: "GEMINI2000/400BB" made by Varian, Inc.
Measurement nuclide: $^1$H (resonant frequency: 400.42 MHz)
Solvent: CDCl$_3$ test sample: about 5-10 w/v % CDCl$_3$
Solution measurement temperature: About 22° C.
(b) FT/IR analysis:
Infrared-absorption-spectrum apparatus (IR): "FT/IR-8300", made by JASCO Corp. Method: Liquid film method (using a KBr plate)
(c) SEC (size exclusion chromatography) analysis:
SEC apparatus: made by JASCO Corp.
Column oven: "860-CO", made by JASCO Corp.
Degasser: "DG-980-50", made by JASCO Corp.
Pump: "PU-980", made by JASCO Corp.
Detector (RI type, UV type): "830-RI (RI type)", made by JASCO Corp.
Column: "Ultrastyragel Plus MX 10$^3$ Å", made by Waters Corp., (two columns are connected in series)
Eluent phase: tetrahydrofuran
Calibration curve: made by using standard polystyrene samples.

(Production of Macro Monomer b)
Produced in a similar manner as "macro monomer a" through synthesis and purification except for using a both-terminal hydroxylated dimethylsiloxane (polymerization degree: 60, hydroxyl equivalent: 2330 g/mol; "KF-6003" made by Shin-Etsu Chemical Co., Ltd.). The thus-produced macro monomer b was a slightly yellowish viscous transparent liquid and showed a number-average molecular weight of 7,700.

(Production of Macro Monomer c)
In the presence of iron (III) acetylacetonate as a catalyst, p-methoxy phenol as a polymerization inhibitor and n-hexane as a solvent, isocyanato ethyl methacrylate and a both-terminal hydroxylated dimethylsiloxane (polymerization degree: 20, hydroxyl equivalent: 920 g/mol; "KF-6001" made by Shin-Etsu Chemical Co., Ltd.) were added, heated and stirred. A crude product thus produced was extracted and washed in n-hexane and acetonitrile, and the resultant n-hexane layer was recovered and subjected to distilling-off of the organic solvent and the low-molecular compound under a reduced pressure. The thus-produced macro monomer c was a pale yellow transparent liquid and showed a number-average molecular weight of 3,400.

(Production of Macro Monomer d)
222.3 g of isophorone diisocyanate (hereafter abbreviated as IPDI), 6.85 g of triethylamine (TEDA) as a catalyst were placed and started to be stirred at a set bath temperature of 40° C. Then, 2065 g of a both-terminal hydroxylated dimethylsiloxane (polymerization degree: 40, hydroxyl equivalent: 1480 g/mol; "KF-6002" made by Shin-Etsu Chemical Co., Ltd.) was added in 4 divisions, and after the final addition, stirring was continued for 16 hours at a kept temperature of 40° C. for reaction, followed by cooling. Thereafter, the synthesis and purification were continued similarly as in the production of macro monomer a except for addition of 66.2 g of 2-hydroxyethyl acrylate (hereafter called HEA) and 0.20 g of TEDA. The thus-produced macro monomer d was a pale yellow transparent liquid and showed a number-average molecular weight of 13,600.

[Component (II)]
Compounds denoted by the following abbreviations were used.
NMMP: 1-methyl-3-methylene-2-pyrrolidinone (formula mass=111, polymer density=1.20, ρe (electron density)=0.649)
DMAA: N,N-dimethyl acryl amide (formula mass=99, polymer density=1.14, ρe=0.62)
GMA: Glycerol methacrylate (formula mass=160, polymer density=1.19, ρe=:0.64)
HEA: 2-hydroxyethyl acrylate (formula mass=116, polymer density=1.15, ρe=0.615)
N-VP: N-vinyl pyrrolidone (formula mass=111, polymer density=1.17, ρe=0.63)
[Component (III)]
Compounds denoted by the following abbreviations were used.
TRIS-MA: Tris(trimethylsiloxy)silylpropyl methacrylate (formula mass=423, polymer density: 0.95, ρe=0.518)
TRIS-A: Tris(trimethylsiloxy)silylpropyl acrylate (formula mass=409, polymer density=0.95, ρe=0.52)
DI-GMA: Methyldi(trimethylsiloxy)silylpropylglyceryl methacrylate (formula mass=423, polymer density=1.19, ρe=0.64)
2-MTA: 2-methoxyethyl acrylate (formula mass=130, polymer density=1.12, ρe=0.602)

[Other Components]

Compounds denoted by the following abbreviations were used in small quantities as functional components.

EDMA: Ethylene glycol dimethacrylate (crosslinking agent)
HMPPO: 2-hydroxy-2-methylpropiophenone (photopolymerization initiator).

In Example 7, n-BuOH (n-butanol) was used as a solvent.

Example 1

20 Liters of a stating liquid comprising 40 parts of macro monomer a, 40 parts of NMMP, 20 parts of TRIS-MA, 0.4 part of EDMA and 0.4 part of HMPPO and having a density $\rho=1010$ kg/m$^3$ and a viscosity $\mu=0.047$ Pa·s was placed at a depth H=about 0.29 m in a cylindrical vessel having an inner diameter D=0.295 m and stirred for 20 min. with two flat paddle blades (i.e., number of blades $n_p=2$) each having a blade diameter d=0.15 m and a blade width b=0.03 m and rotating at 5 rps, thereby preparing a polymerization material liquid I.

The composition of the polymerization material liquid I is collectively shown in Table 5 appearing hereafter together with polymerization material liquids II-X used in Examples and Comparative Examples described hereafter.

The above-prepared polymerization material liquid I was poured in a mold made of polypropylene and having a shape for production of a contact lens (having sizes after hydration processing including a diameter of 14 mm, a center portion thickness of 0.08 mm and a base curve BC=8.60 mm) and irradiated for 20 minutes with UV light from a high-pressure mercury lamp (2 kW), to be photo-polymerized. After the polymerization, the polymer in the form a contact lens or a film was immersed in distilled water to be swollen up to equilibrium and then subjected to high-pressure vapor sterilization (121° C., 20 minutes) with a solution containing a phosphoric acid buffer.

The thus-obtained lens-shaped article was subjected to evaluation with respect to various items described above.

The outline of Example 1 described above and evaluation results thereof are inclusively summarized in Table 6 hereafter together with those of the following Examples and Comparative Examples.

Examples 2-10 and Comparative Examples 1-4

Polymerization material liquids were prepared in the same manner as in Example 1 except for changing the material liquid compositions and stirring conditions as shown in Table 6, and thereafter were successively subjected to polymerization, production of lens-shaped articles, hydration treatment and evaluation, respectively, in the same manner as in Example 1.

Incidentally, as for Example 7 having used a material composition containing n-butanol as a solvent, the polymerization was performed by using a mold so as to form a product which would provide an identical size as those of the other Examples after hydration, and the polymerized product was once swollen in ethanol, then immersed in distilled water to be swollen up to equilibrium and subjected to high-pressure vapor sterilization with a solution containing a phosphoric acid buffer, followed by evaluation with respect to various items.

The outline of the above-mentioned Examples and Comparative Examples and the results thereof are collectively shown in Table 6 hereafter.

INDUSTRIAL APPLICABILITY

Table 6 appearing hereafter shows that a copolymer produced according to the present invention through a process including steps of stirring a material liquid containing specific components (I), (II) and (III) under conditions represented by a controlled stirring power, and then cast-polymerizing the stirred material, comprised a well-developed intermediate region (B) which does not solvate with a hydrophilic solvent between a hydrophobic region (A) and a hydrophilic region (C), and a contact lens produced from the copolymer was not only excellent in transparency and softness represented by a good feel evaluation and an appropriate initial elastic modulus but also was provided with a good balance of dynamic properties including appropriate rupture elastic modulus, initial elastic modulus and stress relaxation coefficient, and further with a high oxygen permeability.

In contrast thereto, a starting mixture liquid obtained from similar components but formed under a low stirring power, even if it visually appeared to be uniform, resulted in a copolymer after its cast-polymerization which exhibited inferior dynamic properties represented by a low rupture elastic modulus and a low modulus ratio (=rupture elastic modulus/initial elastic modulus) (Comparative Example 1).

On the other hand, in Comparative Example 3 having adopted an excessive stirring power, air bubbles were generated in the material mixture solution after stirring, and remains of air bubbles were also observed in the resultant contact lens obtained after standing for 30 minutes and cast-polymerization. Further, a potion other than the remaining bubbles of the contact lens exhibited a normal volume rate of the intermediate region (B) and normal dynamic characteristics, but the contact lens was judged to be not a commercially acceptable product as a result of overall evaluation.

In Comparative Example 4 where starting material mixture liquid X not containing a component (III) was subjected to a proper stirring energy condition of $3.89 \times 10^3$ kJ/m3 and then cast-polymerization, the resultant copolymer exhibited a very low value of only 0.8% as a volume rate of the intermediate region (B) with respect to the region (A) and the contact lens obtained therefrom exhibited a high rupture elastic modulus relative to the initial elastic modulus (elastic modulus ratio=2.5). This leads to difficulties, such as a foreign matter sensation after eyeblink, liable to be a cause of anterior-epithelium-of-cornea barrier, or remaining of deformation after washing with fingers of the lens after use.

TABLE 1

Swollen copolymer data (Example 1)

| | | | | Volume fraction in swollen copolymer | | | In Region C | | Distribution in Region C | | | | |
|---|---|---|---|---|---|---|---|---|---|---|---|---|---|
| Swollen sample | Water/ methanol (Volume ratio) | Solvent Electron density *9 | Volume Swelling rate *1 | Region A $\phi A$ *2 | Region B $\phi B$ *3 | Region C $\phi C$ *4 | $\phi C$ polymer *6 | $\phi C$ Solvent *5 | $\phi C$ polymer *7 | $\phi C$ Solvent *8 | Region C *10 | Three region | Electron density Normalized |
| (1) | 100/0 | 0.554 | 1.482 | 0.2715 | 0.0320 | 0.6965 | 0.3712 | 0.3252 | 0.5330 | 0.4670 | 0.5807 | 0.0162 | 1.000 |
| (2) | 90/10 | 0.5477 | 1.519 | 0.2649 | 0.0313 | 0.7039 | 0.3622 | 0.3417 | 0.5146 | 0.4854 | 0.5767 | 0.0142 | 0.879 |
| (3) | 80/20 | 0.5393 | 1.572 | 0.2559 | 0.0302 | 0.7139 | 0.3500 | 0.3639 | 0.4903 | 0.5097 | 0.5711 | 0.0118 | 0.726 |
| (4) | 70/30 | 0.5302 | 1.641 | 0.2452 | 0.0289 | 0.7259 | 0.3353 | 0.3906 | 0.4619 | 0.5381 | 0.5643 | 0.0092 | 0.570 |
| (5) | 60/40 | 0.5203 | 1.726 | 0.2331 | 0.0275 | 0.7394 | 0.3188 | 0.4206 | 0.4311 | 0.5689 | 0.5564 | 0.0069 | 0.425 |
| (6) | 50/50 | 0.5096 | 1.827 | 0.2202 | 0.0260 | 0.7538 | 0.3011 | 0.4527 | 0.3995 | 0.6005 | 0.5474 | 0.0049 | 0.303 |
| (7) | 40/60 | 0.4982 | 1.944 | 0.2070 | 0.0244 | 0.7686 | 0.2830 | 0.4856 | 0.3682 | 0.6318 | 0.5372 | 0.0036 | 0.220 |
| (8) | 30/70 | 0.486 | 2.077 | 0.1937 | 0.0229 | 0.7834 | 0.2649 | 0.5185 | 0.3381 | 0.6619 | 0.5259 | 0.0030 | 0.185 |
| (9) | 20/80 | 0.473 | 2.226 | 0.1807 | 0.0213 | 0.7979 | 0.2472 | 0.5508 | 0.3098 | 0.6902 | 0.5136 | 0.0034 | 0.208 |
| (10) | 10/90 | 0.4593 | 2.391 | 0.1683 | 0.0199 | 0.8119 | 0.2301 | 0.5818 | 0.2834 | 0.7166 | 0.5003 | 0.0048 | 0.294 |
| (11) | 0/100 | 0.445 | 2.572 | 0.1564 | 0.0185 | 0.8251 | 0.2139 | 0.6112 | 0.2593 | 0.7407 | 0.4863 | 0.0072 | 0.443 |

*1: One-dimensional expansion ratio before and after swelling was measured, and was raised to the power of three.
*2: Volume fraction of Region (A) in a dry state/Vlume swelling rate.
*3: Calculated as $\phi B = \phi A \times \kappa$, while changing $\kappa$.
In the above Table, values calculated by using $\kappa = 0.118$ finally determined are indicated.
*4: $\phi C = 1 - \phi A - \phi B$
*5: $\phi$ Csolvent $= 1 - 1/$Volume swelling rate
*6: $\phi$ Cpolymer $= \phi C - \phi$ Csolvent
*7: $\phi C$ polymer *6/($\phi C$ polymer *6 + $\phi C$ solvent *5)
*8: $\phi$ Csolvent *5/($\phi$ Cpolymer *6 + $\phi$ Csolvent *5)
*9: Water electron density (=0.56) × $\phi$ water + methanol electron density (=0.45) × $\phi$ methanol
*10: Electron density of $\phi$ Cpolymer (=0.604) × $\phi$ Cpolymer *7 + Electron density of $\phi$ Csolvent (=0.554) × $\phi$ solvent *8

TABLE 2

Swollen copolymer data (Comparative Example 1)

| | | | | Volume fraction in swollen copolymer | | | In Region C | | Distribution in Region C | | | | |
|---|---|---|---|---|---|---|---|---|---|---|---|---|---|
| Swollen sample | Water/ methanol (Volume ratio) | Solvent Electron density *9 | Volume Swelling rate *1 | Region A $\phi A$ *2 | Region B $\phi B$ *3 | Region C $\phi C$ *4 | $\phi C$ polymer *6 | $\phi C$ Solvent *5 | $\phi C$ polymer *7 | $\phi C$ Solvent *8 | Region C *10 | Three region | Electron density Normalized |
| (1) | 100/0 | 0.554 | 1.482 | 0.2715 | 0.0109 | 0.7177 | 0.3924 | 0.3252 | 0.5468 | 0.4532 | 0.5814 | 0.0160 | 1.000 |
| (2) | 90/10 | 0.5477 | 1.519 | 0.2649 | 0.0106 | 0.7245 | 0.3829 | 0.3417 | 0.5284 | 0.4716 | 0.5775 | 0.0139 | 0.872 |
| (3) | 80/20 | 0.5393 | 1.572 | 0.2559 | 0.0102 | 0.7338 | 0.3700 | 0.3639 | 0.5041 | 0.4959 | 0.5720 | 0.0113 | 0.710 |
| (4) | 70/30 | 0.5302 | 1.641 | 0.2452 | 0.0098 | 0.7450 | 0.3544 | 0.3906 | 0.4757 | 0.5243 | 0.5654 | 0.0087 | 0.542 |
| (5) | 60/40 | 0.5203 | 1.726 | 0.2331 | 0.0093 | 0.7576 | 0.3369 | 0.4206 | 0.4448 | 0.5552 | 0.5576 | 0.0061 | 0.381 |
| (6) | 50/50 | 0.5096 | 1.827 | 0.2202 | 0.0088 | 0.7710 | 0.3183 | 0.4527 | 0.4129 | 0.5871 | 0.5486 | 0.0038 | 0.240 |
| (7) | 40/60 | 0.4982 | 1.944 | 0.2070 | 0.0083 | 0.7848 | 0.2992 | 0.4856 | 0.3812 | 0.6188 | 0.5386 | 0.0022 | 0.135 |
| (8) | 30/70 | 0.486 | 2.077 | 0.1937 | 0.0077 | 0.7985 | 0.2800 | 0.5185 | 0.3506 | 0.6494 | 0.5274 | 0.0012 | 0.076 |
| (9) | 20/80 | 0.473 | 2.226 | 0.1807 | 0.0072 | 0.8120 | 0.2613 | 0.5508 | 0.3217 | 0.6783 | 0.5152 | 0.0011 | 0.071 |
| (10) | 10/90 | 0.4593 | 2.391 | 0.1683 | 0.0067 | 0.8250 | 0.2432 | 0.5818 | 0.2948 | 0.7052 | 0.5020 | 0.0020 | 0.126 |
| (11) | 0/100 | 0.445 | 2.572 | 0.1564 | 0.0063 | 0.8373 | 0.2261 | 0.6112 | 0.2700 | 0.7300 | 0.4880 | 0.0039 | 0.242 |

*1: One-dimensional expansion ratio before and after swelling was measured, and was raised to the power of three.
*2 Volume fraction of Region (A) in a dry state/Vlume swelling rate.
*3 Calculated as $\phi B = \phi A \times \kappa$, while changing $\kappa$.
In the above Table, values calculated by using $\kappa = 0.04$ finally determined are indicated.
*4: $\phi C = 1 - \phi A - \phi B$
*5: $\phi C$ solvent $- 1 - 1/$Volume swelling rate
*6: $\phi$ polymer $= \phi C - \phi C$ solvent
*7: $\phi C$ polymer *6/($\phi$ Cpolymer *6 + $\phi$ Csolvent *5)
*8: $\phi$ solvent *5/($\phi$ Cpolymer *6 + $\phi$ Csolvent *5)
*9: Water electron density (=0.56) × $\phi$ water + methanol electron density (=0.45) × $\phi$ methanol
*10: Electron density of $\phi$ Cpolymer (=0.604) × $\phi$ Cpolymer *7 + Electron density of $\phi$ Csolvent (=0.554) × $\phi$ Csolvent *8

TABLE 3

Integral value of dispersion profile (Example 1)

| Swollen sample | Water/methanol (Volume ratio) | Integral value | Normalized Integral value Qmi |
|---|---|---|---|
| (1) | 100/0 | 352550 | 1 |
| (2) | 90/10 | 310797 | 0.882 |
| (3) | 80/20 | 265722 | 0.754 |
| (4) | 70/30 | 195528 | 0.555 |
| (5) | 60/40 | 154398 | 0.438 |
| (6) | 50/50 | 105014 | 0.298 |
| (7) | 40/60 | 81452 | 0.231 |
| (8) | 30/70 | 68164 | 0.193 |
| (9) | 20/80 | 76602 | 0.217 |
| (10) | 10/90 | 113705 | 0.323 |
| (11) | 0/100 | 158241 | 0.449 |

TABLE 4

Integral value of dispersion profile (Comparative Example 1)

| Swollen sample | Water/methanol (Volume ratio) | Integral value | Normalized Integral value Qmi |
|---|---|---|---|
| (1) | 100/0 | 332550 | 1.000 |
| (2) | 90/10 | 285722 | 0.859 |
| (3) | 80/20 | 238951 | 0.719 |
| (4) | 70/30 | 178528 | 0.537 |
| (5) | 60/40 | 127398 | 0.383 |
| (6) | 50/50 | 82014 | 0.247 |
| (7) | 40/60 | 45951 | 0.138 |
| (8) | 30/70 | 30452 | 0.092 |
| (9) | 20/80 | 27164 | 0.082 |
| (10) | 10/90 | 46500 | 0.140 |
| (11) | 0/100 | 84205 | 0.253 |

TABLE 5

Starting liquid composition (wt. part(s))

| Starting liquid | I | | II | | III | | IV | | V | |
|---|---|---|---|---|---|---|---|---|---|---|
| Component (I) | Macromer a | 40 | Macromer a | 30 | Macromer a | 40 | Macromer a | 30 | Macromer b | 40 |
| Component (II) | NMMP | 40 | DMAA | 40 | DMAA | 40 | DMAA | 25 | NMMP | 40 |
| | | | | | | | NVP | 25 | | |
| Component (III) | TRIS-MA | 20 | DI-GMA | 30 | TRIS-MA | 20 | TRIS-A | 20 | TRIS-MA | 20 |
| Other | EDMA | 0.4 | EDMA | 0.4 | EDMA | 0.4 | EDMA | 0.4 | EDMA | 0.4 |
| Components | HMPPO | 0.4 | HMPPO | 0.4 | HMPPO | 0.4 | HMPPO | 0.4 | HMPPO | 0.4 |

| Starting liquid | VI | | VII | | VIII | | IX | | X | |
|---|---|---|---|---|---|---|---|---|---|---|
| Component (I) | Macromer c | 35 | Macromer a | 40 | Macromer d | 30 | Macromer a | 38 | Macromer a | 50 |
| Component (II) | NMMP | 30 | GMA | 15 | NMMP | 30 | NVP | 42 | NMMP | 50 |
| | DMAA | 10 | HEA | 25 | | | | | | |
| Component (III) | TRIS-MA | 25 | TRIS-A | 20 | TRIS-A | 40 | MTA | 20 | | |
| Other | EDMA | 0.4 | n-BtOH | 50 | EDMA | 0.4 | EDMA | 0.4 | EDMA | 0.4 |
| Components | HMPPO | 0.4 | EDMA | 0.4 | HMPPO | 0.4 | HMPPO | 0.4 | HMPPO | 0.4 |
| | | | HMPPO | 0.4 | | | | | | |

TABLE 6

| | Example | | 1 | 2 | 3 | 4 | 5 | 6 | 7 |
|---|---|---|---|---|---|---|---|---|---|
| Material | Starting liquid composition | | I | II | III | IV | V | VI | VII |
| | Stirred liquid volume: V | [L] | 20 | 10 | 20 | 20 | 20 | 20 | 20 |
| | Kinetic viscosity: $\nu$ | [mm2/s] | 47 | 137 | 26 | 12 | 29 | 60 | 23 |
| | Viscosity: $\eta$ | [Pa·s] | 0.047 | 0.138 | 0.026 | 0.012 | 0.029 | 0.061 | 0.021 |
| | Density: $\rho$ | [kg/m3] | 1010 | 1010 | 1000 | 1020 | 1010 | 1010 | 930 |
| Stirring conditions | Rotation speed: n | [rps] | 5 | 10 | 3 | 3 | 2 | 5 | 5 |
| | Number of stirring blades | [sheet] | 2 | 2 | 2 | 2 | 2 | 2 | 2 |
| | Stirring-blade span: d | [m] | 0.15 | 0.12 | 0.12 | 0.12 | 0.12 | 0.15 | 0.15 |
| | Vessel diameter: D | [m] | 0.295 | 0.235 | 0.295 | 0.295 | 0.295 | 0.295 | 0.295 |
| | Solution height: H | [m] | 0.29 | 0.23 | 0.29 | 0.29 | 0.29 | 0.29 | 0.29 |
| | Blade width: b | [m] | 0.03 | 0.025 | 0.025 | 0.025 | 0.025 | 0.03 | 0.03 |
| | A | [—] | 33.38 | 34.25 | 31.80 | 31.80 | 31.80 | 33.38 | 33.38 |
| | B | [—] | 1.22 | 1.25 | 1.40 | 1.40 | 1.40 | 1.22 | 1.22 |
| | p | [—] | 1.51 | 1.52 | 1.42 | 1.42 | 1.51 | 1.51 | 1.51 |
| | Reynolds number: Re | [—] | $2.4 \times 10^3$ | $1.1 \times 10^3$ | $1.7 \times 10^3$ | $3.6 \times 10^3$ | $9.9 \times 10^2$ | $1.9 \times 10^3$ | $4.8 \times 10^3$ |
| | Stirring power number: Np | [—] | 0.85 | 1.00 | 1.06 | 0.92 | 1.14 | 0.89 | 0.73 |
| | Stirring time | [Part] | 20 | 30 | 30 | 30 | 30 | 30 | 30 |
| | Stirring power: P v | [W/m^3] | 407 | $2.51 \times 10^3$ | 35.6 | 31.5 | 11.5 | 427 | 322 |
| | Stirring energy | [kJ/m^3] | 489 | $4.52 \times 10^3$ | 64.1 | 56.7 | 20.6 | 768 | 580 |
| Evaluation of liquid after stirring | Relative small-angle X-ray scattering intensity | [—] | 0.14 | 0.03 | 0.11 | 0.13 | 0.12 | 0.08 | 0.15 |
| | Bubble evaluation | [—] | A | A | A | A | A | A | A |
| | Fluctuation evaluation | [—] | A | A | A | A | A | A | A |
| Evaluation of shaped article | Rate of Region B | [Volume %] | 11.8 | 12.0 | 11.9 | 12.2 | 10.5 | 10.1 | 20 |
| | Transparency | [—] | A | A | A | A | A | A | A |
| | Bubble generation | [—] | A | A | A | A | A | A | A |
| | Feel | [—] | A | B | A | A | A | A | B |

TABLE 6-continued

|  |  |  | | | | | | |
|---|---|---|---|---|---|---|---|---|
| | Rupture elastic modulus | [N/mm2] | 0.12 | 0.3 | 0.18 | 0.11 | 0.17 | 0.29 | 0.33 |
| | Initial elastic modulus | [N/mm2] | 0.14 | 0.32 | 0.17 | 0.13 | 0.15 | 0.33 | 0.36 |
| | Modulus ratio | [—] | 0.86 | 0.94 | 1.06 | 0.85 | 1.13 | 0.88 | 0.92 |
| | Stress relaxation c. | [%] | 10.0 | 19 | 10.5 | 12.7 | 12.4 | 15.5 | 18.3 |
| | Oxygen permeability c. | *1 | 138 | 126 | 113 | 125 | 116 | 156 | 170 |

| | Example | | 8 | 9 | Comp. 1 | Comp. 2 | Comp. 3 | Comp. 4 |
|---|---|---|---|---|---|---|---|---|
| Material | Starting liquid composition | | VIII | IX | I | I | II | X |
| | Stirred liquid volume: V | [L] | 20 | 20 | 20 | 20 | 10 | 10 |
| | Kinetic viscosity: ν | [mm2/s] | 153 | 66 | 47 | 47 | 137 | 322 |
| | Viscosity: η | [Pa·s] | 0.155 | 0.067 | 0.047 | 0.047 | 0.138 | 0.320 |
| | Density: ρ | [kg/m3] | 1010 | 1015 | 1010 | 1010 | 1017 | 995 |
| Stirring | Rotation speed: n | [rps] | 5 | 4 | 2 | 1 | 15 | 5 |
| condi- | Number of stirring blades | [sheet] | 2 | 2 | 2 | 2 | 2 | 2 |
| tions | Stirring-blade span: d | [m] | 0.15 | 0.12 | 0.08 | 0.08 | 0.15 | 0.18 |
| | Vessel diameter: D | [m] | 0.295 | 0.295 | 0.295 | 0.295 | 0.235 | 0.235 |
| | Solution height: H | [m] | 0.29 | 0.29 | 0.28 | 0.28 | 0.23 | 0.23 |
| | Blade width: b | [m] | 0.03 | 0.025 | 0.016 | 0.016 | 0.03 | 0.05 |
| | A | [—] | 33.38 | 31.80 | 27.96 | 27.96 | 37.86 | 54.51 |
| | B | [—] | 1.22 | 1.40 | 1.57 | 1.57 | 1.04 | 1.29 |
| | p | [—] | 1.42 | 1.19 | 1.19 | 1.19 | 1.56 | 1.77 |
| | Reynolds number: Re | [—] | $9.8*10^2$ | $8.6*10^2$ | $2.7*10^2$ | $1.4*10^2$ | $7.2*10^3$ | $1.6*10^3$ |
| | Stirring power number: Np | [—] | 0.99 | 1.17 | 1.53 | 1.68 | 0.69 | 0.92 |
| | Stirring time | [Part] | 30 | 20 | 20 | 20 | 20 | 30 |
| | Stirring power: Pv | [W/m$^3$] | 475 | 946 | 2.03 | 0.278 | $1.80*10^4$ | $2.16*10^3$ |
| | Stirring energy | [kJ/m$^3$] | 854 | 113 | 2.43 | 0.334 | $2.16*10^4$ | $3.89*10^3$ |
| Evalu- | Relative small-angle | [—] | 0.12 | 0.09 | 1 | 1.8 | 0.03 | 0.02 |
| ation of | X-ray scattering | | | | | | | |
| liquid | intensity | | | | | | | |
| after | Bubble evaluation | [—] | B | A | A | A | C | B |
| stirring | Fluctuation evaluation | [—] | A | A | A | C | A | A |
| Evalu- | Rate of Region B | [Volume %] | 13 | 14 | 4 | —*2 | 11.5 *3 | 0.8 |
| ation of | Transparency | [—] | A | A | B | C | A | A |
| shaped | Bubble generation | [—] | B | A | A | A | C | B |
| article | Feel | [—] | A | A | A | B | B | A |
| | Rupture elastic modulus | [N/mm2] | 0.12 | 0.12 | 0.05 | —*2 | 0.31 | 0.5 |
| | Initial elastic modulus | [N/mm2] | 0.13 | 0.13 | 0.15 | —*2 | 0.34 | 0.2 |
| | Modulus ratio | [—] | 0.92 | 0.92 | 0.33 | —*2 | 0.91 | 2.50 |
| | Stress relaxation c. | [%] | 14.0 | 11.2 | 7 | 5 | 20 | 15 |
| | Oxygen permeability c. | *1 | 119 | 87 | 132 | 130 | 125 | 140 |

*1: $\times 10^{-11}$(cm2/sec) · (mLO2/mLxmmHg)
*2 Non-uniformity was recognied even by observation with eyes, so that the article was judged to be not worth evaluation since the evaluation result was affected by the part for the measurement.
*3: For the small-angle X-ray scattering measurement, a part obviating bubble was irradiated with X-rays.

The invention claimed is:

1. A contact lens, comprising: a hydrate of a copolymer of at least three components including (I) a both terminal-polymerizable silicone oligomer component that forms a hydrophobic region (A) in the copolymer, (II) a hydrophilic monomer component that forms a hydrophilic region (C) in the copolymer, and (III) a hydrophobic monomer component having a molecular weight of at most 700 g/mol that forms the hydrophilic region (C) together with the component (II) and also contributes to formation of an intermediate region (B) which does not solvate with any methanol/water mixture solvent between the hydrophobic region (A) and the hydrophilic region (C), wherein said intermediate region (B) shows a volume rate of 5 to 40% with respect to the region (A) in the copolymer, and the contact lens is free from turbidity and bubbles therein by observation with eyes and exhibits an initial modulus of 0.1-0.5 N/mm$^2$.

2. The contact lens according to claim 1, comprising a hydrate of the copolymer which comprises 1 to 40% of the region (A), 0.1 to 20% of the region (B) and 40 to 98.9% of the region (C), respectively on a volume basis.

3. The contact lens according to claim 1, wherein said both terminal-polymerizable silicone oligomer component (I) is a both terminal-polymerizable macro-monomer having a siloxane structure denoted by a general formula (I-1) or a general formula (I-2) as shown below, and shows a viscosity of at least 200 mPa·s at room temperature:

general formula (I-1):

$$A^1\text{-}(U^1\text{—}S^1\text{—})_n Y^2\text{—}S^2\text{—}U^3\text{-}A^2 \qquad (I-1),$$

[wherein $A^1$ and $A^2$ each independently denote an active unsaturated group which has an active unsaturated polymerizable terminal group, an alkylene group of 1-20 carbon atoms, or an alkylene glycol group of 1-20 carbon atoms, $U^1$ denotes a diurethane unit which forms a urethane bond, a diurea unit which forms a urea bond, a diamide unit which forms an amide bond, or a diester unit which forms an ester bond, respectively, together with $A^1$ and $S^1$ or $S^1$ and $S^1$, neighboring on both sides thereof, $U^2$ denotes a diurethane unit which forms a urethane bond, a diurea unit which forms a urea bond, a diamide unit which forms an amide bond, or a diester unit which forms an ester bond, respectively, together with $A^1$ and $S^2$ or $S^1$ and $5^2$, neighboring on both sides thereof, $U^3$ denotes a diurethane unit which forms a urethane bond, a diurea unit which forms a urea bond, a diamide unit which forms an amide bond, or a diester unit which forms an ester bond, respectively, together with $S^2$ and $A^2$, neighboring on both sides thereof, $S^1$ and $S^2$ each independently denote a group represented by:

[Formula 1]

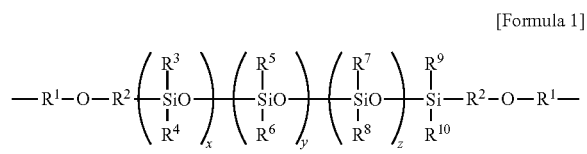

(wherein $R^1$ and $R^2$ each independently denote an alkylene group of 1-20 carbon atoms, $R^3$, $R^4$, $R^5$, $R^6$, $R^7$, $R^8$, $R^9$, and $R^{10}$ each independently denote a linear, branched or cyclic alkyl group of 1-20 carbon atoms capable of being substituted by a fluorine atom, a group represented by a formula: $A^3$-$U^4$—$R^1$—O—$R^2$— (wherein $A^3$ denotes a terminal-polymerizable active unsaturated group, a terminal-polymerizable active unsaturated group having an alkylene group of 1-20 carbon atoms, or a terminal-polymerizable active unsaturated group having an alkylene glycol group of 1-20 carbon atoms, $U^4$ denotes a diurethane unit which forms a urethane bond, a diurea unit which forms a urea bond, a diamide unit which forms an amide bond, or a diester unit which forms an ester bond, respectively together with $A^3$ and $R^1$, and $R^1$ and $R^2$ are the same as denoted above), or a linear or cyclic hydrocarbon group having at least one substituent selected from hydroxyl group and oxyalkylene group, x denotes an integer of 1-1500, y denotes o or an integer of 0-1499, z denotes 0 or an integer of 1-1499, and x+y+z makes an integer of 1-1500), n denotes 0 or an integer of 1-10];

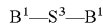            General formula (1-2):

[wherein $B^1$ denotes a terminal-polymerizable active unsaturated unit having a urethane bond, a urea bond, an amide bond, or an ester bond, $S^3$ denotes a group represented by:

[Formula 2]

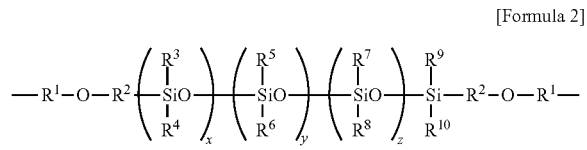

(wherein $R^1$ and $R^2$ each independently denote an alkylene group of 1-20 carbon atoms, $R^3$, $R^4$, $R^5$, $R^6$, $R^7$, $R^8$, $R^9$, and $R^{10}$ each independently denote a linear, branched or cyclic alkyl group of 1-20 carbon atoms 1-20 capable of being substituted by a fluorine atom, a group represented by a formula: $A^3$-$U^4$—$R^1$—O—$R^2$— (wherein $A^3$ denotes a terminal-polymerizable active unsaturated unit, a terminal-polymerizable active unsaturated unit having an alkylene group of 1-20 carbon atoms, or a terminal-polymerizable active unsaturated unit having an alkylene glycol group of 1-20 carbon atoms, $U^4$ denotes a diurethane unit which forms a urethane bond, a diurea unit which forms a urea bond, a diamide unit which forms an amide bond, or a diester unit which forms an ester bond, respectively together with $A^3$ and $R^1$, and $R^2$ are the same as denoted above), or a linear or cyclic hydrocarbon group having at least one substituent selected from hydroxyl group and oxyalkylene group, x denotes an integer of 1-1500, y denotes 0 or an integer of 1-1499, z denotes 0 or an integer of 1-1499, and x+y+z makes an integer of 1-1500).

4. The contact lens according to claim 1, wherein said hydrophilic monomer component (II) is a hydrophilic monomer selected from the group consisting of 1-alkyl-3-methylene-2-pyrroridones, N-substituted acrylamides, N-vinyl lactams, hydroxyalkyl (meth)acrylates, (alkyl)amino-alkyl (meth)acrylates, alkylene glycol mono-(meth)acrylates, and (meth)acrylic acid.

5. The contact lens according to claim 1, wherein said hydrophobic monomer component (III) having a molecular weight of at most 700 is selected from the group consisting of silicone-containing alkyl (meth)acrylates, alkyl (meth)acrylates, and fluorine-containing alkyl (meth)acrylates.

6. The contact lens according to claim 1, wherein said copolymer is a polymerization product of a monomer mixture including 1-40 wt. % of the component (I), 10-60 wt. % of the component (II) and 10-45 wt. % of component (III) (the above wt. % values being based on total amount of the components (I)-(III)), and also 0.05-1 wt. part of a crosslinking agent in addition to 100 wt. parts in total of said components (I)-(III).

7. The contact lens according to claim 6, wherein said copolymer is a polymerization product of a monomer mixture including 2-35 wt. % of the component (I), 20-50 wt. % of the component (II) and 15-40 wt. % of component (III) (the above wt. % values being based on total amount of the components (I)-(III)), and also 0.1-0.8 wt. part of a crosslinking agent in addition to 100 wt. parts in total of said components (I)-(III).

8. The contact lens according to claim 6, exhibiting an oxygen permeability coefficient Dk of at least $87 \times 10^{-11}$ $(cm^2/sec) \cdot (mL\ O_2/mL \times mmHg)$.

9. The contact lens according to claim 1, exhibiting a rupture modulus of 0.1-0.5 $N/mm^2$, a stress relaxation coefficient of 8 to 25%, and an oxygen permeability coefficient Dk of at least $56 \times 10^{-11}$ $(cm^2/sec) \cdot (mL\ O_2/mL \times mmHg)$.

10. A process for producing a contact lens according to claim 1, comprising: stirring a material liquid comprising at least three components of said components (I), (II) and (III) under a stirring power of 5-10000 $W/m^3$ per unit volume of the material liquid for at least 10 minutes, and then injecting the stirred material liquid into a lens mold to polymerize the material liquid.

11. The process according to claim 10, wherein said stirring is performed by means of a flat paddle blade.

12. The process according to claim 10, wherein said material liquid has a viscosity of 0.01-0.40 Pa·s.

13. The process according to claim 10, wherein said stirring provides a stirring energy of 5-20000 $kJ/m^3$ to a unit volume of the material liquid.

14. The process according to claim 10, wherein the stirring is continued for period of 20-30 minutes.

15. The contact lens according to claim 1, wherein said intermediate region (B) in the copolymer shows a volume rate of 8-25% with respect to said region (A).

* * * * *